US012384879B2

(12) United States Patent
Condie et al.

(10) Patent No.: US 12,384,879 B2
(45) Date of Patent: Aug. 12, 2025

(54) THIOL-CONTAINING COMPOSITION

(71) Applicant: PPG Industries Ohio, Inc., Cleveland, OH (US)

(72) Inventors: Allison G. Condie, Valencia, PA (US); Masayuki Nakajima, Wexford, PA (US); Kar Tean Tan, Wexford, PA (US); Peter L. Votruba-Drzal, Pittsburgh, PA (US); Maria S. French, Maidenhead (GB); Hongying Zhou, Allison Park, PA (US); Baptiste Rayer, Ribecourt-Dreslincourt (FR)

(73) Assignee: PPG Industries Ohio, Inc., Cleveland, OH (US)

( * ) Notice: Subject to any disclaimer, the term of this patent is extended or adjusted under 35 U.S.C. 154(b) by 865 days.

(21) Appl. No.: 17/277,929

(22) PCT Filed: Sep. 20, 2019

(86) PCT No.: PCT/US2019/052111
§ 371 (c)(1),
(2) Date: Mar. 19, 2021

(87) PCT Pub. No.: WO2020/061431
PCT Pub. Date: Mar. 26, 2020

(65) Prior Publication Data
US 2021/0355272 A1    Nov. 18, 2021

Related U.S. Application Data

(60) Provisional application No. 62/733,816, filed on Sep. 20, 2018.

(51) Int. Cl.
| | |
|---|---|
| *C08G 63/664* | (2006.01) |
| *B29C 64/118* | (2017.01) |
| *B29K 63/00* | (2006.01) |
| *B33Y 10/00* | (2015.01) |
| *B33Y 70/00* | (2020.01) |
| *C08G 59/06* | (2006.01) |
| *C08G 59/56* | (2006.01) |
| *C08G 59/66* | (2006.01) |
| *C08G 63/78* | (2006.01) |
| *C08L 63/00* | (2006.01) |
| *C08L 81/02* | (2006.01) |
| *C09D 7/63* | (2018.01) |
| *C09D 163/00* | (2006.01) |
| *C09D 167/04* | (2006.01) |
| *C09J 11/06* | (2006.01) |
| *C09J 163/00* | (2006.01) |
| *C09J 167/04* | (2006.01) |
| *G10K 11/162* | (2006.01) |

(52) U.S. Cl.
CPC .......... *C08G 63/664* (2013.01); *B33Y 70/00* (2014.12); *C08G 59/066* (2013.01); *C08G 59/56* (2013.01); *C08G 59/66* (2013.01); *C08G 63/78* (2013.01); *C08L 63/00* (2013.01); *C08L 81/02* (2013.01); *C09D 7/63* (2018.01); *C09D 163/00* (2013.01); *C09D 167/04* (2013.01); *C09J 11/06* (2013.01); *C09J 163/00* (2013.01); *C09J 167/04* (2013.01); *G10K 11/162* (2013.01); *B29C 64/118* (2017.08); *B29K 2063/00* (2013.01); *B29K 2995/0002* (2013.01); *B33Y 10/00* (2014.12); *C08L 2205/035* (2013.01)

(58) Field of Classification Search
CPC .... C08G 63/664; C08G 63/78; C08G 59/066; C08G 59/56; C08G 59/66; C09D 7/63; C09D 167/04; C09D 163/00; C09J 11/06; C09J 167/04; C09J 163/00; C08L 81/02; C08L 2205/035; C08L 63/00; B33Y 70/00; B33Y 10/00; B29C 64/118; B29K 2063/00; B29K 2995/0002; G10K 11/162
See application file for complete search history.

(56) References Cited

U.S. PATENT DOCUMENTS

| | | | |
|---|---|---|---|
| 4,793,867 A | 12/1988 | Charles et al. | |
| 5,430,112 A | 7/1995 | Sakata et al. | |
| 5,588,989 A | 12/1996 | Vonk et al. | |
| 6,172,179 B1 | 1/2001 | Zook et al. | |
| 6,569,980 B1* | 5/2003 | Masaoka | C04B 41/4905 528/34 |
| 6,913,798 B2 | 7/2005 | Kitamura et al. | |
| 7,541,075 B2 | 6/2009 | Kitamura et al. | |

(Continued)

FOREIGN PATENT DOCUMENTS

| | | |
|---|---|---|
| CN | 107531886 A | 1/2018 |
| JP | 2009-167251 A2 | 7/2009 |

(Continued)

OTHER PUBLICATIONS

Phipps et al., "Dissolution Behaviour of Calcium Carbonate in Mildly Acidic Conditions", in the Science of Papermaking, Trans. of the XIIth Fund. Res. Symp. Oxford, 2001, (C.F. Baker, ed.), pp. 415-427, FRC, Manchester, 2018, DOI: 10.15376/frc.2001.1.415.*
"Plastics Handbook", edited by Yinghong, O., Ordnance Industry Press, 1st edition, 1st printing in Feb. 1991, p. 573.
Coating Technology vol. Five, compiled by the coating technology training class of the Ministry of Raw and Fuel Chemical Industry, Chemical Engineering Industry Press, 1st edition, 1st printing, Jun. 1982, pp. 34-35.

*Primary Examiner* — Patrick D Niland
(74) *Attorney, Agent, or Firm* — Alicia M. Passerin

(57) ABSTRACT

The present invention is directed toward a composition comprising: an epoxy compound, a polythiol curing agent, and a second curing agent. Also disclosed are methods of treating a substrate with the composition and substrates formed by such methods.

14 Claims, 10 Drawing Sheets

(56) References Cited

U.S. PATENT DOCUMENTS

| | | | |
|---|---|---|---|
| 7,749,368 B2 | 7/2010 | McMurdie et al. | |
| 8,673,091 B2 | 3/2014 | McMillen et al. | |
| 8,976,361 B2 | 3/2015 | Kato | |
| 9,315,698 B2 | 4/2016 | Zaffaroni et al. | |
| 9,562,175 B2 | 2/2017 | Asay et al. | |
| 2005/0143496 A1 | 6/2005 | Mueller | |
| 2006/0020076 A1* | 1/2006 | Finerman | C08G 59/18 524/494 |
| 2012/0129980 A1 | 5/2012 | Desai et al. | |
| 2013/0023603 A1 | 1/2013 | Walter et al. | |
| 2013/0267136 A1 | 10/2013 | Salnikov et al. | |
| 2015/0165670 A1 | 6/2015 | Hebert et al. | |
| 2015/0299379 A1 | 10/2015 | Knight et al. | |
| 2016/0137839 A1 | 5/2016 | Rolland et al. | |
| 2017/0166687 A1 | 6/2017 | Ortelt et al. | |
| 2018/0127538 A1 | 5/2018 | Ye et al. | |
| 2022/0127448 A1 | 4/2022 | Condie et al. | |

FOREIGN PATENT DOCUMENTS

| | | |
|---|---|---|
| JP | 2016-501970 A | 1/2016 |
| WO | WO2014100245 A2 | 6/2014 |
| WO | WO2016176548 A1 | 11/2016 |
| WO | 2019060513 A1 | 3/2019 |
| WO | WO2019060559 A1 | 3/2019 |
| WO | 2020191202 A1 | 9/2020 |

\* cited by examiner

THIOL-CONTAINING COMPOSITION

CROSS-REFERENCE TO RELATED APPLICATION

This application claims priority to U.S. Provisional Patent Application No. 62/733,816, filed on Sep. 20, 2018, which is incorporated herein by reference.

FIELD OF THE INVENTION

The present invention relates to thiol-containing compositions and more particularly to sealant, adhesive, and coating compositions.

BACKGROUND OF THE INVENTION

Coating compositions, including sealants and adhesives, are utilized in a wide variety of applications to treat a variety of substrates or to bond together two or more substrate materials.

SUMMARY OF THE INVENTION

Disclosed is a composition comprising: an epoxy-containing compound; a polythiol curing agent; and a second curing agent; wherein the epoxy-containing compound has an epoxide equivalent weight of more than 400 g/eq and the polythiol curing agent has a thiol equivalent weight of no more than 600 g/eq or the epoxy-containing compound has an epoxide equivalent weight of no more than 400 g/eq and the polythiol curing agent has a thiol equivalent weight of more than 600 g/eq.

Also disclosed is a composition comprising: an epoxy-containing compound; a polythiol curing agent; a second curing agent; and a filler package comprising at least one filler, the filler package having a pH of no more than 10.5 measured on a 10 weight percent slurry of the filler package in deionized water.

Also disclosed is a composition comprising: an epoxy-containing compound; a polythiol curing agent; and a second curing agent; wherein the composition has a theoretical maximum resin cross-link density no more than 4 mol/kg.

Also disclosed are methods for treating a substrate with one of the compositions disclosed herein.

Also disclosed are substrates comprising a surface at least partially coated with a layer formed from one of the compositions disclosed herein.

Also disclosed are vehicles comprising one of the substrates disclosed herein.

DETAILED DESCRIPTION OF THE INVENTION

Figure 1:
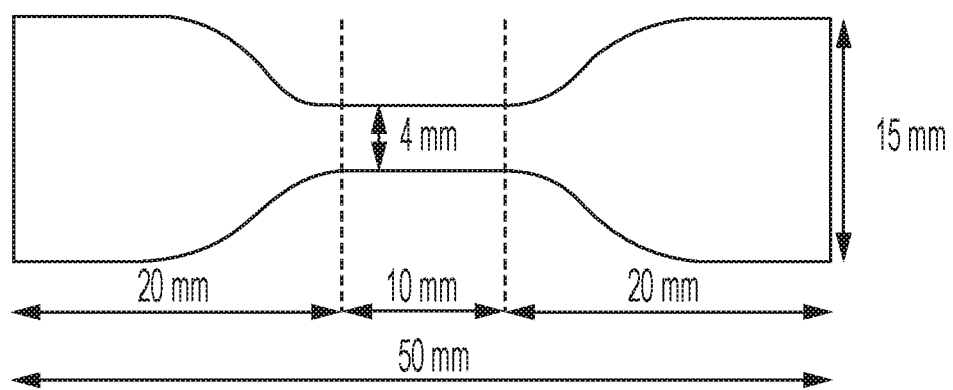
FIG. 1 is a schematic of the dog bone samples.

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, unless indicated otherwise, a plural term can encompass its singular counterpart and vice versa, unless indicated otherwise. For example, although reference is made herein to "a" polythiol curing agent, "an" epoxy-containing compound and "a" filler material, a combination (i.e., a plurality) of these components can be used.

In addition, in this application, the use of "or" means "and/or" unless specifically stated otherwise, even though "and/or" may be explicitly used in certain instances.

As used herein, the terms "on," "onto," "applied on," "applied onto," "formed on," "deposited on," "deposited onto," mean formed, overlaid, deposited, or provided on but not necessarily in contact with the surface. For example, a coating composition "applied onto" a substrate does not preclude the presence of one or more other intervening coating layers of the same or different composition located between the coating composition and the substrate.

As used herein, a "coating composition" refers to a composition that, in an at least partially dried or cured state, is capable of producing a film, layer, or the like on at least a portion of a substrate surface.

As used herein, a "sealant composition" refers to a coating composition that, in an at least partially dried or cured state, has an elongation of at least 50% and/or at least 1 MPa load at failure as determined according to ASTM D-412 and has the ability to resist atmospheric conditions, such as moisture and temperature and at least partially block the transmission of materials, such as water, fuel, and other liquids and gasses.

As used herein, an "adhesive composition" refers to a coating composition, e.g., a solution, mixture, or a dispersion, that, in an at least partially dried or cured state, produces a load-bearing joint, such as a load-bearing joint having a lap shear strength of greater than 5 MPa, as determined according to ASTM D1002-10 using an Instron 5567 machine in tensile mode with a pull rate of 51 mm per minute.

As used herein, the term "one component" or "1K" refers to a composition in which all of the ingredients may be premixed and stored and wherein the reactive components do not readily react at ambient or slightly thermal conditions and has a viscosity that remains workable and/or does not double in viscosity for at least 10 days after mixing as measured at 1,000 Pa shear stress using an Anton-Paar MCR 301 rheometer at ambient temperature using a 40 mm diameter parallel plate with a 0.5 mm gap in rotation mode, but instead react only upon activation by an external energy source. Extremal energy sources that may be used to promote curing include, for example, radiation (i.e., actinic radiation such as ultraviolet light) and/or heat. In examples, the composition may remain workable for at least 10 days after mixing. As used herein, the term "workable" means that the composition is of a viscosity that it is able to be deformed and/or shaped under manual pressure and may have a viscosity less than such viscosity.

As further defined herein, ambient conditions generally refer to room temperature and humidity conditions or temperature and humidity conditions that are typically found in the area in which the composition is applied to a substrate, e.g., at 20° C. to 40° C. and 20% to 80% relative humidity, while slightly thermal conditions are temperatures that are slightly above ambient temperature but are generally below the curing temperature for the composition (i.e., in other words, at temperatures and humidity conditions below which the reactive components will readily react and cure, e.g., >40° C. and less than 100° C., such as less than 90° C. at 20% to 80% relative humidity.

As used herein, the term "cure", "cured" or similar terms, as used in connection with the composition described herein, means that at least a portion of the components that form the composition are crosslinked to form a coating, film, layer, or bond. Additionally, curing of the composition refers to subjecting said composition to curing conditions (e.g., elevated temperature, lowered activation energy) leading to the reaction of the reactive functional groups of the components of the composition, and resulting in the crosslinking of the components of the composition and formation of an at least partially cured or gelled coating. As used herein, the term "at least partially cured" with respect to a coating refers to a coating formed by subjecting the composition to curing conditions such that a chemical reaction of at least a portion of the reactive groups of the components of the composition occurs to form a coating, film, layer, or bond. The coating composition may also be subjected to curing conditions such that a substantially complete cure is attained and wherein further curing results in no significant further improvement in the coating properties such as, for example, increased lap shear performance.

As used herein, the term "catalyst" means a substance that increases the rate or decreases the activation energy of a chemical reaction without itself undergoing any permanent chemical change.

As used herein, the term "curing agent" means any reactive material that can be added to a composition to accelerate curing of the composition (e.g., curing of a polymer). The term "reactive" when used with respect to the curing agent means capable of chemical reactions and includes any level of reaction from partial to complete reaction of a reactant. In some examples, a curing agent may function as a reactive catalyst by decreasing the activation energy of a chemical reaction or may be reactive when it provides for cross-linking or gelling of a polymer.

As used herein, the term "latent curing agent" or "blocked curing agent" or "encapsulated curing agent" means a molecule or a compound that is activated by an external energy source prior to reacting with another component in the composition, such as reacting into (i.e., crosslinking with) a polymeric backbone. For example, the latent curing agent may be in the form of a solid at room temperature and may have no reactivity until it is heated and melts, or the latent curing agent may be reversibly reacted with a second compound that prevents any further reactivity until the reversible reaction is reversed by the application of heat and the second compound is removed, freeing the curing agent to react with other components of the composition.

As used herein, a "polythiol curing agent" refers to a chemical compound having at least two thiol functional groups (—SH) that may be used to "cure" a composition of the present invention a by reacting with the epoxide functional group of the epoxy-containing compound to form a polymeric matrix.

As used herein, the "epoxide equivalent weight" is determined by dividing the theoretical molecular weight of the epoxy-containing compound by the number of epoxide groups present in the epoxy-containing compound. In the case of oligomeric or polymeric epoxy compounds, the epoxide equivalent weight is determined by dividing the average molecular weight of the epoxy compound by the average number of epoxide groups present in the molecules. Epoxy equivalent weight can also be determined by titration of a sample using a Metrohm 808 or 888 Titrando, wherein the mass of an epoxy-containing material used is 0.06 g per 100 g/eq of predicted epoxy equivalent weight. The sample is dissolved in 20 mL of methylene chloride (additional solvent can be used to ensure complete solvation; methanol or tetrahydrofuran may be used as co-solvents) then 40 mL glacial acetic acid is added. One gram of tetraethylammonium bromide is added to the solution before titration with 0.1 N perchloric acid.

As used herein, the "thiol equivalent weight" is determined by dividing the theoretical molecular weight of the polythiol curing agent by the number of thiol groups present in the polythiol curing agent. In the case of oligomeric or polymeric thiol compounds, the thiol equivalent weight is determined by dividing the average molecular weight of the thiol compound by the average number of thiol groups present in the molecules. Alternatively, the thiol equivalent can be determined by titration with silver nitrate using a Metrohm 808 Titrando, wherein the mass of a polythiol material used is 0.05 g per 100 g/eq of predicted thiol equivalent weight. The polythiol is dissolved in 30 mL pyridine and 50 mL tetrahydrofuran (additional solvent may be used to ensure complete solvation). The thiol solution is titrated with 0.1 N silver nitrate.

As used herein, "Mw" refers to the weight average molecular weight and means the value determined by Gel Permeation Chromatography using Waters 2695 separation module with a Waters 410 differential refractometer (RI detector) and polystyrene standards. Tetrahydrofuran (THF) used as the eluent at a flow rate of 1 ml min$^{-1}$, and two PL Gel Mixed C columns used for separation.

As used herein, unless indicated otherwise, the term "substantially free" means that a particular material is not purposefully added to a mixture or composition, respectively, and is only present as an impurity in a trace amount of less than 5% by weight based on a total weight of the mixture or composition, respectively. As used herein, unless indicated otherwise, the term "essentially free" means that a particular material is only present in an amount of less than 2% by weight based on a total weight of the mixture or composition, respectively. As used herein, unless indicated otherwise, the term "completely free" means that a mixture or composition, respectively, does not comprise a particular material, i.e., the mixture or composition comprises 0% by weight of such material.

As used herein, the term "glass transition temperature" ("Tg") refers to the temperature at which an amorphous material, such as glass or a polymer, changes from a brittle vitreous state to a plastic state or from a plastic state to a brittle vitreous state.

The present invention is directed to a composition comprising, or consisting essentially of, or consisting of, an epoxy-containing compound, a polythiol curing agent, and a second curing agent, wherein the equivalent weight ratio of epoxide groups to thiol groups is 50:1 to 1:50. The composition may be a 1K composition and may be a coating composition, such as an adhesive composition or a sealant composition.

In an example, the composition may comprise, or may consist essentially of, or may consist of: an epoxy-containing compound; a polythiol curing agent; and a second curing agent; wherein the epoxy-containing compound has an epoxide equivalent weight of more than 350 g/eq and the polythiol curing agent has a thiol equivalent weight of no more than 600 g/eq or the epoxy-containing compound has an epoxide equivalent weight of no more than 350 g/eq and the thiol curing agent has a thiol equivalent weight of more than 600 g/eq.

In an example, the composition may comprise, or may consist essentially of, or may consist of: an epoxy-containing compound; a polythiol curing agent; a second curing agent; and a filler package comprising at least one filler, the filler package having a pH of no more than 10.5.

In an example, the composition may comprise, or may consist essentially of, or may consist of: an epoxy-containing compound; a polythiol curing agent; and a second curing agent; wherein the composition has a cross-link density of no more than 4 mol/kg, such as no more than 2.5 mol/kg.

Suitable epoxy-containing compounds that may be used in the compositions disclosed herein may comprise polyepoxides (having an epoxide functionality greater than 1), epoxy adducts, or combinations thereof. Suitable polyepoxides include polyglycidyl ethers of Bisphenol A, such as Epon® 828 and 1001 epoxy resins, and Bisphenol F polyepoxides, such as Epon® 862, which are commercially available from Hexion Specialty Chemicals, Inc. Other suitable polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides that are derived from the epoxidation of an olefinically unsaturated nonaromatic cyclic compound, polyepoxides containing oxyalkylene groups in the epoxy molecule, and epoxy novolac resins. Still other suitable epoxy-containing compounds include epoxidized Bisphenol A novolacs, epoxidized phenolic novolacs, epoxidized cresylic novolac. The epoxy-containing compound may also comprise an epoxy-dimer acid adduct. The epoxy-dimer acid adduct may be formed as the reaction product of reactants comprising a diepoxide compound (such as a polyglycidyl ether of Bisphenol A) and a dimer acid (such as a C36 dimer acid), isosorbide diglycidyl ether, and, triglycidyl isocyanurate. The epoxy-containing compound may also comprise a carboxyl-terminated butadiene-acrylonitrile copolymer modified epoxy-containing compound. The epoxy-containing compound may also comprise an epoxy-containing acrylic, such as glycidyl methacrylate.

The epoxy-containing compound may comprise an epoxy-adduct. The composition may comprise one or more epoxy-adducts. As used herein, the term "epoxy-adduct" refers to a reaction product comprising the residue of an epoxy compound and at least one other compound that does not include an epoxide functional group. For example, the epoxy-adduct may comprise the reaction product of reactants comprising: (1) an epoxy compound, a polyol, and an anhydride; (2) an epoxy compound, a polyol, and a diacid; or (3) an epoxy compound, a polyol, an anhydride, and a diacid.

The epoxy compound used to form the epoxy-adduct may comprise any of the epoxy-containing compounds listed above that may be included in the composition.

The polyol used to form the epoxy-adduct may include diols, triols, tetraols and higher functional polyols. Combinations of such polyols may also be used. The polyols may be based on a polyether chain derived from ethylene glycol, propylene glycol, butylene glycol, hexylene glycol and the like as well as mixtures thereof. The polyol may also be based on a polyester chain derived from ring opening polymerization of caprolactone (referred to as polycaprolactone-based polyols hereinafter). Suitable polyols may also include polyether polyols, polyurethane polyols, polyurea polyols, acrylic polyols, polyester polyols, polybutadiene polyols, hydrogenated polybutadiene polyols, polycarbonate polyols, polysiloxane polyols, and combinations thereof. Polyamines corresponding to polyols may also be used, and in this case, amides instead of carboxylic esters will be formed with the diacids and anhydrides.

The polyol may comprise a polycaprolactone-based polyol. The polycaprolactone-based polyols may comprise diols, triols or tetraols terminated with primary hydroxyl groups. Commercially available polycaprolactone-based polyols include those sold under the trade name Capa™ from Perstorp Group, such as, for example, Capa 2054, Capa 2077A, Capa 2085, Capa 2205, Capa 3031, Capa 3050, Capa 3091 and Capa 4101.

The polyol may comprise a polytetrahydrofuran-based polyol. The polytetrahydrofuran-based polyols may comprise diols, triols or tetraols terminated with primary hydroxyl groups. Commercially available polytetrahydrofuran-based polyols include those sold under the trade name Terathane®, such as Terathane® PTMEG 250 and Terathane® PTMEG 650 which are blends of linear diols in which the hydroxyl groups are separated by repeating tetramethylene ether groups, available from Invista. In addition, polyols based on dimer diols sold under the trade names Pripol®, Solvermol™ and Empol®, available from Cognis Corporation, or bio-based polyols, such as the tetrafunctional polyol Agrol 4.0, available from BioBased Technologies, may also be utilized.

The anhydride that may be used to form the epoxy-adduct may comprise any suitable acid anhydride known in the art. For example, the anhydride may comprise hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromelletic dianhydride (PMDA); 3,3',4,4'-oxydiphthalic dianhydride (ODPA); 3,3',4,4'-benzophenone tetracarboxylic dianhydride (BTDA); and 4,4'-diphthalic (hexafluoroisopropylidene) anhydride (6FDA).

The diacid used to form the epoxy-adduct may comprise any suitable diacid known in the art. For example, the diacids may comprise phthalic acid and its derivates (e.g., methyl phthalic acid), hexahydrophthalic acid and its derivatives (e.g., methyl hexahydrophthalic acid), maleic acid, succinic acid, adipic acid, and the like.

The epoxy-adduct may comprise a diol, a monoanhydride or a diacid, and a diepoxy compound, wherein the mole ratio of diol, monoanhydride (or diacid), and diepoxy compounds in the epoxy-adduct may vary from 0.5:0.8:1.0 to 0.5:1.0:6.0.

The epoxy-adduct may comprise a triol, a monoanhydride or a diacid, and a diepoxy compound, wherein the mole ratio of triol, monoanhydride (or diacid), and diepoxy compounds in the epoxy-adduct may vary from 0.5:0.8:1.0 to 0.5:1.0:6.0.

The epoxy-adduct may comprise a tetraol, a monoanhydride or a diacid, and a diepoxy compound, wherein the mole ratio of tetraol, monoanhydride (or diacid), and diepoxy compounds in the epoxy-adduct may vary from 0.5:0.8:1.0 to 0.5:1.0:6.0.

Other suitable epoxy-containing compounds include epoxy-adducts such as polyesters formed as the reaction product of reactants comprising an epoxy-containing compound, a polyol, and an anhydride, as described in U.S. Pat. No. 8,796,361, col. 3, line 42 through col. 4, line 65, the cited portion of which is incorporated herein by reference. For example, useful first epoxy compounds that can be used to form the epoxy-adduct include polyepoxides. Suitable polyepoxides include polyglycidyl ethers of Bisphenol A, such as Epon R 828 and 1001 epoxy resins, and Bisphenol F diepoxides, such as Epon R 862, which are commercially available from Hex ion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting first epoxy compounds include epoxidized Bisphenol A novolacs, epoxidized phenolic novolacs, epoxidized cresylic novolac, and triglycidyl p-aminophenol bisma leiimide. Useful polyols that may be used to form the epoxy-adduct include diols, triols, tetraols and higher functional polyols. The polyols can be based on a polyether chain derived from ethylene glycol, propylene glycol, butylenes glycol, hexylene glycol and the like and mixtures thereof. The polyol can also be based on a polyester chain derived from ring opening polymerization of caprolactone. Suitable polyols may also include polyether polyol, polyurethane polyol, polyurea polyol, acrylic polyol, polyester polyol, polybutadiene polyol, hydrogenated polybutadiene polyol, polycarbonate polyols, polysiloxane polyol, and combinations thereof. Polyamines corresponding to polyols can also be used, and in this case, amides instead of carboxylic esters will be formed with acids and anhydrides. Suitable diols that may be utilized to form the epoxy adduct are diols having a hydroxyl equivalent weight of between 30 and 1000. Exemplary diols having a hydroxyl equivalent weight from 30 to 1000 include diols sold under the trade name Terathane®, including Terathane R250, available from Invista. Other exemplary diols having a hydroxyl equivalent weight from 30 to 1000 include ethylene glycol and its polyether diols, propylene glycol and its polyether diols, butylenes glycol and its polyether diols, hexylene glycols and its polyether diols, polyester diols synthesized by ring opening polymerization of caprolactone, and urethane diols synthesized by reaction of cyclic carbonates with diamines. Combination of these diols and polyether diols derived from combination various diols described above could also be used. Dimer diols may also be used including those sold under trade names Pripol®) and Solvermol™ available from Cognis Corporation. Polytetrahydrofuran-based polyols sold under the trade name Terathane®, including Terathane® 650, available from Invista, may be used. In addition, polyols based on dimer diols sold under the trade names Pripol® and Empol®, available from Cognis Corporation, or bio-based polyols, such as the tetrafunctional polyol Agrol 4.0, available from BioBased Technologies, may also be utilized. Useful anhydride compounds to functionalize the polyol with acid groups include hexahydrophthalic anhydride and its derivatives (e.g. methyl hexahydrophthalic anhydride); phthalic anhydride and its derivatives (e.g. methyl phthalic anhydride); maleic anhydride. Succinic anhydride; trimelletic anhydride; pyromelletic dianhydride (PMDA); 3.3',4,4'-oxy diphthalic dianhydride (ODPA); 3,3', 4,4'-benzopherone tetracarboxylic dianhydride (BTDA); and 4,4'-diphthalic (hex amfluoroisopropylidene) anhydride (6FDA). Useful diacid compounds to functionalize the polyol with acid groups include phthalic acid and its derivates (e.g. methyl phthalic acid), hexahydrophthalic acid and its derivatives (e.g. methyl hexahydrophthalic acid), maleic acid, Succinic acid, adipic acid, etc. Any diacid and anhydride can be used; however, anhydrides are preferred. In one embodiment, the polyol comprises a diol, the anhydride and/or diacid comprises a monoanhydride or a diacid, and the first epoxy compound comprises a diepoxy compound, wherein the mole ratio of diol, monoanhydride (or diacid), and diepoxy compounds in the epoxy-adduct may vary from 0.5:0.8:1.0 to 0.5:1.0:6.0. In another embodiment, the polyol comprises a diol, the anhydride and/or diacid comprises a monoanhydride or a diacid, and the first epoxy compound comprises a diepoxy compound, wherein the mole ratio of diol, monoanhydride (or a diacid), and diepoxy compounds in the epoxy-adduct may vary from 0.5:08:0.6 to 0.5:1.0:6.0.

The epoxy-adducts, when used, may be present in the composition in an amount of at least 10 percent by weight based on the total weight of the composition, such as at least 20 percent by weight, such as at least 30 percent by weight, and may be present in an amount of no more than 65 percent by weight based on total weight of the composition, such as no more than 50 percent by weight, such as no more than 30 percent by weight. The epoxy adducts may be present in the composition in an amount of 10 percent by weight to 65 percent by weight based on total weight of the composition, such as 20 percent by weight to 30 percent by weight, such as 30 percent by weight to 50 percent by weight.

The epoxy-containing compound may have an epoxide equivalent weight of at least 90 g/eq, such as at least 140 g/eq, such as at least 188 g/eq, such as more than 350 g/eq, and may have an epoxide equivalent weight of no more than 2,000 g/eq, such as no more than 1,000 g/eq, such as no more than 350 g/eq. The epoxy-containing compound may have an epoxide equivalent weight of 90 g/eq to 2,000 g/eq, such as 140 g/eq to 1,000 g/eq, such as 90 g/eq to 350 g/eq, such as 188 g/eq to 400 g/eq, such as more than 400 g/eq to 2,000 g/eq, such as more than 350 g/eq to 1,000 g/eq.

The epoxy-containing compound may be present in the composition in an amount of at least 15 weight percent based on total weight of the composition, such as at least 25 weight percent, such as at least 30 weight percent, such as at least 40 weight percent, and may be present in the composition in an amount of no more than 80 weight percent based on total weight of the composition, such as no more than 65 weight percent, such as no more than 60 weight percent, such as no more than 50 weight percent. The epoxy-containing compound may be present in the composition in an amount of 15 weight percent to 80 weight percent based on total weight of the composition, such as 25 weight percent to 65 weight percent, such as 30 weight percent to 50 weight percent, such as 40 weight percent to 60 weight percent.

In another example, the epoxy-containing compound of the composition may further include elastomeric particles. As used herein, "elastomeric particles" refers to particles having a glass transition temperature (Tg) of −70° C. to 0° C. as measured by Differential Scanning Calorimetry (DSC) or Dynamic Mechanical Analysis (DMA). The elastomeric particles may be included in an epoxy carrier resin for introduction into the coating composition. The elastomeric particles may be phase-separated from the epoxy in the epoxy-containing compound. As used herein, the term "phase-separated" means forming a discrete domain within a matrix of the epoxy-containing compound.

The elastomeric particles may have a core/shell structure. Suitable core-shell elastomeric particles may be comprised of an acrylic shell and an elastomeric core. The core may comprise natural or synthetic rubbers, polybutadiene, styrene-butadiene, polyisoprene, chloroprene, acrylonitrile butadiene, butyl rubber, polysiloxane, polysulfide, ethylene-vinyl acetate, fluoroelastomer, polyolefin, hydronated styrene-butadiene, or combinations thereof. The type of elastomeric particles and the concentration thereof is not limited as long as the particle size falls within the specified range as illustrated below.

The average particle size of the elastomeric particles may be, for example, 0.02 microns to 5 microns (20 nm to 5,000 nm), such as 20 nm to 500 nm, such as 50 nm to 250 nm, the reported particle sizes for rubber particles provided by Kanekea Texas Corporation, as measured by standard techniques known in the industry. Suitable methods of measuring particles sizes disclosed herein include, for example, according to ISO 13320 and ISO 22412 or as measured by transmission electron microscopy (TEM). Suitable methods of measuring particle sizes by TEM include suspending elastomeric particles in a solvent selected such that the particles do not swell, and then drop-casting the suspension onto a TEM grid which is allowed to dry under ambient conditions. For example, epoxy resin containing core-shell elastomeric particles may be diluted in butyl acetate for drop casting and measurements may be obtained from images acquired from a Tecnai T20 TEM operating at 200 kV and analyzed using ImageJ software, or an equivalent solvent, instrument and software.

In an example, suitable finely dispersed core-shell elastomeric particles having an average particle size ranging from 50 nm to 250 nm may be master-batched in epoxy resin such as aromatic epoxides, phenolic novolac epoxy resin, bisphenol A and/or bisphenol F diepoxide, and/or aliphatic epoxides, which include cyclo-aliphatic epoxides, at concentrations ranging from 5% to 40% rubber particles by weight based on the total weight of the rubber dispersion, such as from 20% to 35%. Suitable epoxy resins may also include a mixture of epoxy resins. When utilized, the epoxy carrier resin may be an epoxy-containing component of the present invention such that the weight of the epoxy-containing component present in the composition includes the weight of the epoxy carrier resin.

Exemplary non-limiting commercial core-shell elastomeric particle products using poly(butadiene) rubber particles that may be utilized in the composition include core-shell poly(butadiene) rubber powder (commercially available as PARALOID™ EXL 2650A from Dow Chemical), a core-shell poly(butadiene) rubber dispersion (25% core-shell rubber by weight) in bisphenol F diglycidyl ether (commercially available as Kane Ace MX 136), a core-shell poly(butadiene) rubber dispersion (33% core-shell rubber by weight) in Epon® 828 (commercially available as Kane Ace MX 153), a core-shell poly(butadiene) rubber dispersion (33% core-shell rubber by weight) in Epiclon® EXA-835LV (commercially available as Kane Ace MX 139), a core-shell poly(butadiene) rubber dispersion (37% core-shell rubber by weight) in bisphenol A diglycidyl ether (commercially available as Kane Ace MX 257), and a core-shell poly(butadiene) rubber dispersion (37% core-shell rubber by weight) in Epon® 863 (commercially available as Kane Ace MX 267), and core-shell poly(butadiene) rubber dispersion (40% rubber by weight) in bisphenol A diglycidyl ether (commercially available as Kane Ace MX 150), each available from Kaneka Texas Corporation, and acrylic rubber dispersions.

Exemplary non-limiting commercial core-shell elastomeric particle products using styrene-butadiene rubber particles that may be utilized in the composition include a core-shell styrene-butadiene rubber powder (commercially available as CLEARSTRENGTH® XT100 from Arkema), core-shell styrene-butadiene rubber powder (commercially available as PARALOID™ EXL 2650J), a core-shell styrene-butadiene rubber dispersion (33% core-shell rubber by weight) in bisphenol A diglycidyl ether (commercially available as Fortegra™ 352 from Olin™), core-shell styrene-butadiene rubber dispersion (33% rubber by weight) in low viscosity bisphenol A diglycidyl ether (commercially available as Kane Ace MX 113), a core-shell styrene-butadiene rubber dispersion (25% core-shell rubber by weight) in bisphenol A diglycidyl ether (commercially available as Kane Ace MX 125), a core-shell styrene-butadiene rubber dispersion (25% core-shell rubber by weight) in bisphenol F diglycidyl ether (commercially available as Kane Ace MX 135), a core-shell styrene-butadiene rubber dispersion (25% core-shell rubber by weight) in D.E.N.™-438 phenolic novolac epoxy (commercially available as Kane Ace MX 215), a core-shell styrene-butadiene rubber dispersion (25% core-shell rubber by weight) in Araldite® MY-721 multi-functional epoxy (commercially available as Kane Ace MX 416), a core-shell styrene-butadiene rubber dispersion (25% core-shell rubber by weight) in MY-0510 multi-functional epoxy (commercially available as Kane Ace MX 451), a core-shell styrene-butadiene rubber dispersion (25% core-shell rubber by weight) in Syna Epoxy 21 Cyclo-aliphatic Epoxy from Synasia (commercially available as Kane Ace MX 551), and a core-shell styrene-butadiene rubber dispersion (25% core-shell rubber by weight) in polypropylene glycol (MW 400) (commercially available as Kane Ace MX 715), each available from Kaneka Texas Corporation. Other commercially available core-shell rubber particle dispersions include Fortegra 352 (33% core-shell rubber particles by weight in bisphenol A liquid epoxy resin), available from Olin Corporation. Other commercially available core-shell rubber particle dispersions include Paraloid™ EXL 2650A (core-shell poly(butadiene) commercially available from Dow.

Exemplary non-limiting commercial core-shell elastomeric particle products using polysiloxane rubber particles that may be utilized in the composition include a core-shell polysiloxane rubber powder (commercially available as GENIOPERL® P52 from Wacker), a core-shell polysiloxane rubber dispersion (40% core-shell rubber by weight) in bisphenol A diglycidyl ether (commercially available as ALBIDUR® EP2240A from Evonick), a core-shell polysiloxane rubber dispersion (25% core-shell rubber by weight) in jER™828 (commercially available as Kane Ace MX 960), a core-shell polysiloxane rubber dispersion (25% core-shell rubber by weight) in Epon® 863 (commercially available as Kane Ace MX 965) each available from Kaneka Texas Corporation.

The elastomeric particles may be present in the composition in an amount of at least 2 percent by weight based on the total weight of the composition, such as at least 3 percent by weight, such as at least 10 percent by weight, and may be present in an amount of no more than 40 percent by weight based on total weight of the composition, such as no more than 35 percent by weight, such as no more than 24 percent by weight. The elastomeric particles may be present in the composition in an amount of 2 percent by weight to 40 percent by weight based on total weight of the composition, such as 3 percent by weight to 35 percent by weight, such as 10 percent by weight to 24 percent by weight.

The elastomeric particles may be present in the composition in an amount such that the weight ratio of epoxy-containing compounds to core-shell rubber particles may be at least 2:1, such as at least 2.5:1, such as at least 3.0:1, and may be no more than 6:1, such as no more than 5.5:1, such as no more than 5:1. The elastomeric particles may be present in the composition in an amount such that the weight ratio of epoxy-containing compounds to core-shell rubber particles may be 2:1 to 6:1, such as 2.5:1 to 3.0:1, such as 3:1 to 5:1.

As discussed above, the compositions disclosed herein also may comprise a polythiol curing agent.

The polythiol curing agent may comprise a compound comprising at least two thiol functional groups. For example, the polythiol curing agent may comprise a dithiol, trithiol, tetrathiol, pentathiol, hexathiol or higher functional polythiol compound. The polythiol curing agent may comprise a dithiol compound such as 3,6-dioxa-1,8-octanedithiol (DMDO), 3-oxa-1,5-pentanedithiol, 1,2-ethanedithiol, 1,3-propanedithiol, 1,2-propanedithiol, 1,4-butanedithiol, 1,3-butanedithiol, 2,3-butanedithiol, 1,5-pentanedithiol, 1,3-pentanedithiol, 1,6-hexanedithiol, 1,3-dithio-3-methylbutane, ethylcyclohexyldithiol (ECHDT), methylcyclohexyldithiol, methyl-substituted dimercaptodiethyl sulfide, dimethyl-substituted dimercaptodiethyl sulfide, 2,3-dimercapto-1-propanol, bis-(4-mercaptomethylphenyl) ether, 2,2'-thiodiethanethiol, and glycol dimercaptoacetate (commercially available as THIOCURE® GDMA from BRUNO BOCK Chemische Fabrik GmbH & Co. KG). The polythiol curing agent may comprise a trithiol compound such as trimethylolpropane trimercaptoacetate (commercially available as THIOCURE® TMPMA from BRUNO BOCK Chemische Fabrik GmbH & Co. KG), trimethylopropane tris-3-mercaptopropionate (commercially available as THIOCURE® TMPMP from BRUNO BOCK Chemische Fabrik GmbH & Co. KG), ethoxylated trimethylpropane tris-3-mercaptopropionate polymer (commercially available as THIOCURE® ETTMP from BRUNO BOCK Chemische Fabrik GmbH & Co. KG), tris[2-(3-mercaptopropionyloxy) ethyl]isocyanurate (commercially available as THIOCURE® TEMPIC from BRUNO BOCK Chemische Fabrik GmbH & Co. KG). The polythiol curing agent may comprise a tetrathiol compound such as pentaerythritol tetramercaptoacetate (commercially available as THIOCURE® PETMA from BRUNO BOCK Chemische Fabrik GmbH & Co. KG), pentaerythritol tetra-3-mercaptopropionate (commercially available as THIOCURE® PETMP from BRUNO BOCK Chemische Fabrik GmbH & Co. KG), and polycaprolactone tetra(3-mercaptopropionate) (commercially available as THIOCURE® PCL4MP 1350 from BRUNO BOCK Chemische Fabrik GmbH & Co. KG). Higher functional polythiol curing agents may include dipentaerythritol hexa-3-mercaptopropionate (commercially available as THIOCURE® DiPETMP from BRUNO BOCK Chemische Fabrik GmbH & Co. KG). Combinations of polythiol curing agents may also be used.

The polythiol curing agent may comprise a mercaptan terminated polysulfide. Commercially available mercaptan terminated polysulfides include those sold under the trade name THIOKOL® LP from Toray Fine Chemicals Co., Ltd., including, but not limited to, LP-3, LP-33, LP-23, LP-980, LP-2, LP-32, LP-12, LP-31, LP-55 and LP-56. The THIOKOL LP mercaptan terminated polysulfides have the general structure HS—$(C_2H_4O$—$CH_2$—$O$—$C_2H_4$—$S$—$S)_n$ $C_2H_4O$—$CH_2$—$O$—$C_2H_4$—SH, wherein n is an integer of 5 to 50. Other commercially available mercaptan terminated polysulfides include those sold under the trade name THIOPLAST® G™ from Akzo Nobel Chemicals International B.V., including, but not limited to, G 10, G 112, G 131, G 1, G 12, G 21, G 22, G 44 and G 4. The THIOPLAST G mercaptan terminated polysulfides are blends of di- and tri-functional mercaptan-functional polysulfides with the difunctional unit having the structure HS—$(R$—$S$—$S)_n$—R—SH, wherein n is an integer from 7 to 38, and the tri-functional unit having the structure HS—$(R$—$S$—$S)_a$—$CH_2$—$CH((S$—$S$—$R)_c$—SH)—$CH_2$—$(S$—$S$—$R)_b$—SH, wherein a +b+c=n and n is an integer from 7 to 38.

The polythiol curing agent may comprise a mercaptan terminated polyether. Commercially available mercaptan terminated polyether include POLYTHIOL QE-340M available from Toray Fine Chemicals Co., Ltd.

The polythiol curing agent may comprise a thiol-terminated sulfur-containing polymer. The sulfur-containing polymer may comprise a polythioether, a polysulfide, and a combination thereof. The sulfur-containing polymer may comprise a mixture of different polythioethers and/or polysulfides, and the polythioethers and/or polysulfides may have the same or different functionality. In examples, the sulfur-containing polymer may have an average functionality of at least 2, such as no more than 6, such as no more than 4, such as no more than 3. In examples, the sulfur-containing polymer may have an average functionality of 2 to 6, such as 2 to 4, such as 2 to 3, such as 2.05 to 2.8. For example, a sulfur-containing polymer can be selected from a difunctional sulfur-containing polymer, a trifunctional sulfur-containing polymer, and a combination thereof.

In examples, a sulfur-containing polymer may be thiol-terminated, and in examples, may comprise a thiol-terminated polythioether. Examples of thiol-terminated polythioethers are disclosed, for example, in U.S. Pat. No. 6,172,179.

In examples, a thiol-terminated polythioether may comprise Permapol® P3.1E, available from PPG Aeorspace, Sylmar, Calif.

The polythiol curing agent may have a thiol equivalent weight of at least 80 g/eq, such as at least 100 g/eq, such as at least 125 g/eq, such as more than 600 g/eq, and may have a thiol equivalent weight of no more than 2,500 g/eq, such as no more than 2,000 g/eq, such as no more than 1,650 g/eq, such as no more than 600 g/eq. The polythiol curing agent may have a thiol equivalent weight of 80 g/eq to 2,500 g/eq, such as 100 g/eq to 2,000 g/eq, such as 125 g/eq to 1,650 g/eq, such as 80 g/eq to 600 g/eq, such as more than 600 g/eq to 2,500 g/eq.

The polythiol curing agent may be present in the composition in an amount such that the ratio of the epoxide equivalent weight of epoxy-containing compound to the thiol equivalent weight of the polythiol curing agent may be at least 1:50, such as at least 1:28, such as at least 1:14, such as at least 1:9, and may be no more than 50:1, such as no more than 30:1, such as no more than 10:1, such as no more than 4:1. The polythiol curing agent may be present in the composition in an amount such that the ratio of the epoxide equivalent weight of epoxy compounds to the thiol equivalent weight of the polythiol curing agent may be 1:50 to 50:1, such as 1:28 to 30:1, such as 1:14 to 10:1, such as 1:9 to 4:1.

The polythiol curing agent may be present in the composition in an amount of at least 4 weight percent based on total weight of the composition, such as at least 6 weight percent, such as at least 8 weight percent, and may be present in the composition in an amount of no more than 60 weight percent based on total weight of the composition, such as no more than 50 weight percent, such as no more than 40 weight percent. The polythiol curing agent may be present in the composition in an amount of 4 weight percent to 60 weight percent based on total weight of the composition, such as 6 weight percent to 50 weight percent, such as 8 weight percent to 40 weight percent.

The composition may further comprise a second curing agent. The second curing agent may comprise a latent curing agent. In examples, the second curing agent may be an encapsulated curing agent, a blocked curing agent, or combinations thereof. The latent curing agent may be activatable by an external energy source.

In examples, the latent curing agent may comprise, or consist essentially of, or consist of, a guanidine. It will be understood that "guanidine," as used herein, refers to guanidine and derivatives thereof. For example, the curing agent that may be used includes guanidines, substituted guanidines, substituted ureas, melamine resins, guanamine derivatives, heat-activated cyclic tertiary amines, aromatic amines and/or mixtures thereof. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide, e.g. Dyhard® available from AlzChem). Representatives of suitable guanamine derivatives which may be mentioned are alkylated benzoguanamine resins, benzoguanamine resins or methoxymethylethoxymethylbenzoguanamine.

For example, the guanidine may comprise a compound, moiety, and/or residue having the following general structure:

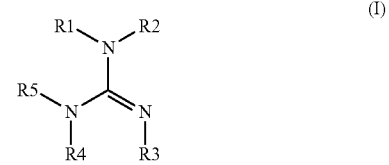

wherein each of R1, R2, R3, R4, and R5 (i.e., substituents of structure (I)) comprise hydrogen, (cyclo)alkyl, aryl, aromatic, organometallic, a polymeric structure, or together can form a cycloalkyl, aryl, or an aromatic structure, and wherein R1, R2, R3, R4, and R5 may be the same or different. As used herein, "(cyclo)alkyl" refers to both alkyl and cycloalkyl. When any of the R groups "together can form a (cyclo)alkyl, aryl, and/or aromatic group", it is meant that any two adjacent R groups are connected to form a cyclic moiety, such as the rings in structures (II)-(V) below.

It will be appreciated that the double bond between the carbon atom and the nitrogen atom that is depicted in structure (I) may be located between the carbon atom and another nitrogen atom of structure (I). Accordingly, the various substituents of structure (I) may be attached to different nitrogen atoms depending on where the double bond is located within the structure.

The guanidine may comprise a cyclic guanidine such as a guanidine of structure (I) wherein two or more R groups of structure (I) together form one or more rings. In other words, the cyclic guanidine may comprise ≥1 ring(s). For example, the cyclic guanidine may either be a monocyclic guanidine (1 ring) such as depicted in structures (II) and (III) below, or the cyclic guanidine may be bicyclic or polycyclic guanidine (≥2 rings) such as depicted in structures (IV) and (V) below.

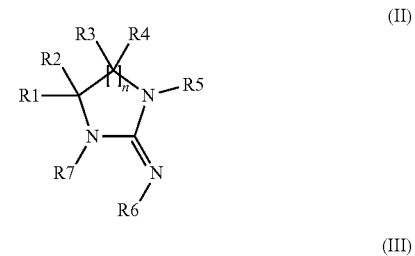

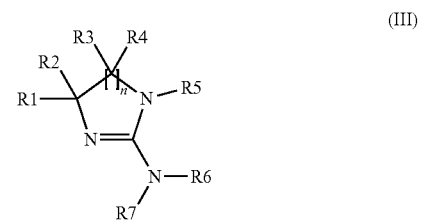

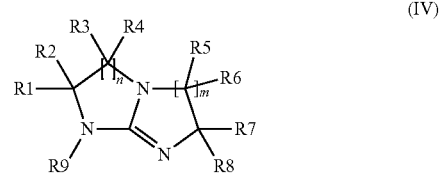

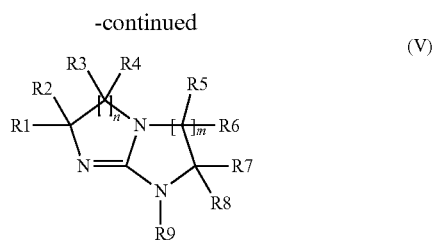

(V)

Each substituent of structures (II) and/or (III), R1-R7, may comprise hydrogen, (cyclo)alkyl, aryl, aromatic, organometallic, a polymeric structure, or together can form a cycloalkyl, aryl, or an aromatic structure, and wherein R1-R7 may be the same or different. Similarly, each substituent of structures (IV) and (V), R1-R9, may be hydrogen, alkyl, aryl, aromatic, organometallic, a polymeric structure, or together can form a cycloalkyl, aryl, or an aromatic structure, and wherein R1-R9 may be the same or different. Moreover, in some examples of structures (II) and/or (III), certain combinations of R1-R7 may be part of the same ring structure. For example, R1 and R7 of structure (II) may form part of a single ring structure. Moreover, it will be understood that any combination of substituents (R1-R7 of structures (II) and/or (III) as well as R1-R9 of structures (IV) and/or (V)) may be chosen so long as the substituents do not substantially interfere with the catalytic activity of the cyclic guanidine.

Each ring in the cyclic guanidine may be comprised of ≥5 members. For example, the cyclic guanidine may comprise a 5-member ring, a 6-member ring, and/or a 7-member ring. As used herein, the term "member" refers to an atom located in a ring structure. Accordingly, a 5-member ring will have 5 atoms in the ring structure ("n" and/or "m"=1 in structures (II)-(V)), a 6-member ring will have 6 atoms in the ring structure ("n" and/or "m"=2 in structures (II)-(V)), and a 7-member ring will have 7 atoms in the ring structure ("n" and/or "m"=3 in structures (II)-(V)). It will be appreciated that if the cyclic guanidine is comprised of ≥2 rings (e.g., structures (IV) and (V)), the number of members in each ring of the cyclic guanidine can either be the same or different. For example, one ring may be a 5-member ring while the other ring may be a 6-member ring. If the cyclic guanidine is comprised of ≥3 rings, then in addition to the combinations cited in the preceding sentence, the number of members in a first ring of the cyclic guanidine may be different from the number of members in any other ring of the cyclic guanidine.

It will also be understood that the nitrogen atoms of structures (II)-(V) may further have additional atoms attached thereto. Moreover, the cyclic guanidine may either be substituted or unsubstituted. For example, as used herein in conjunction with the cyclic guanidine, the term "substituted" refers to a cyclic guanidine wherein R5, R6, and/or R7 of structures (II) and/or (III) and/or R9 of structures (IV) and/or (V) is not hydrogen. As used herein in conjunction with the cyclic guanidine, the term "unsubstituted" refers to a cyclic guanidine wherein R1-R7 of structures (II) and/or (III) and/or R1-R9 of structures (IV) and/or (V) are hydrogen.

The cyclic guanidine may comprise a bicyclic guanidine, and the bicyclic guanidine may comprise 1,5,7-triazabicyclo[4.4.0]dec-5-ene ("TBD" or "BCG").

In addition, catalytically-active substituted ureas may also be used as the latent curing agent. Suitable catalytically-active substituted ureas include p-chlorophenyl-N,N-dimethylurea, 4,4'-methylenebis(phenyldimethyl urea), 1,1-dimethylurea, N-3-(dimethylamino)carbonylaminomethyl-3,5,5-trimethylcyclohexyl-N,N-dimethylurea, [1,1'-(4-methyl-m-phenylene)bis(3,3-dimethylurea)], 3-phenyl-1,1-dimethylurea (fenuron) or 3,4-dichlorophenyl-N,N-dimethylurea (also known as Diuron, available from Alz Chem). Examples of non-limiting commercially available latent curing agents comprising substituted ureas include the products sold under the trade name Dyhard including Dyhard UR 200, Dyhard UR 300, Dyhard UR 400, Dyhard UR 500, Dyhard UR 700, and Dyhard UR 800.

Other useful latent curing agents may comprise amidoamine or polyamide curing agents, such as, for example, one of the Ancamide® products available from Air Products, amine, dihydrazide, imidazole, or dicyandiamide adducts and complexes, or combinations thereof. The latent curing agent may also comprise a reaction product of reactants comprising (i) an epoxy compound, and (ii) an amine and/or an alkaloid. For example, the (b) heat-activated latent curing agent may comprise a reaction product of reactants comprising (i) an epoxy compound and (ii) an amine, or a reaction product of reactants comprising (i) an epoxy compound and (ii) an alkaloid. Such heat-activated latent curing agents are described in paragraphs [0098] through [0110] of U.S. Publication No. 2014/0150970, the cited portion of which is incorporated herein by reference. Examples of non-limiting commercially available latent curing agents comprising a reaction product of reactants comprising (i) an epoxy compound, and (ii) an amine and/or an alkaloid include the products sold under the trade name Ajicure including Ajicure PN-23, Ajicure PN-H, Ajicure PN-31, Ajicure PN-40, Ajicure PN-50, Ajicure PN-23J, Ajicure PN-31J, Ajicure PN-40J, Ajicure MY-24 and Ajicure MY-2, available from Ajinomoto Fine-Techno Co., Inc. For example, useful latent curing agents include, as examples, the following:

General structure

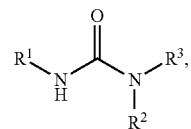

wherein $R^1$, $R^2$, and $R^3$ each can be a hydrogen, a cyclic aliphatic, a non-cyclic aliphatic, or an aromatic, and $R^1$, $R^2$, and $R^3$ can be the same or different;

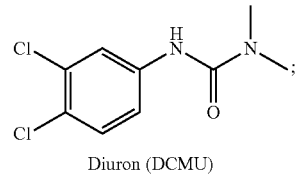

Diuron (DCMU)

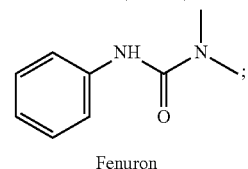

Fenuron

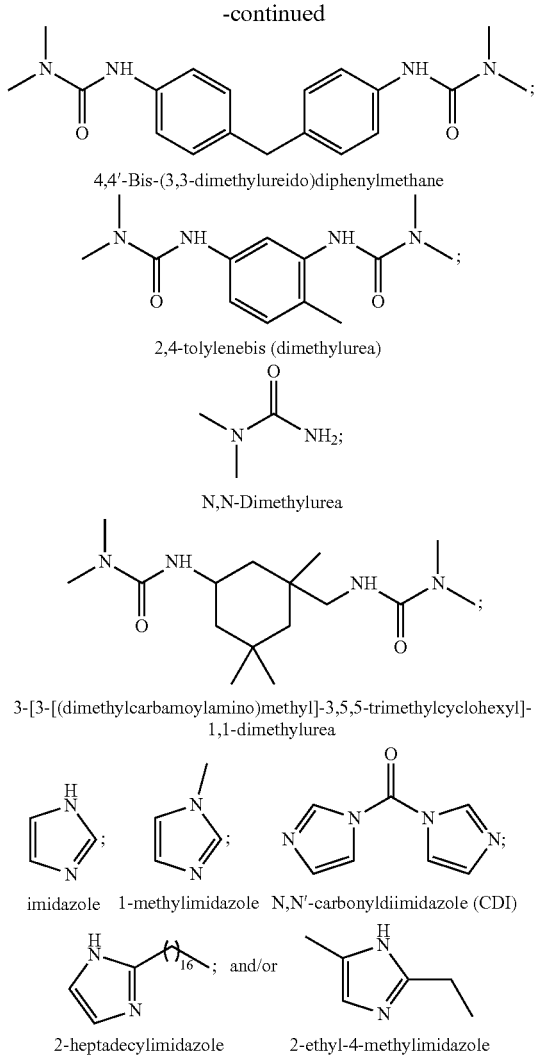

The latent curing agent may be present in the composition in an amount of at least 0.01 percent by weight based on the total weight of the composition, such as at least 0.02 percent by weight, such as at least 0.03 percent by weight, and may be present in an amount of no more than 15 percent by weight, such as no more than 10 percent by weight, such as no more than 5 percent by weight. The latent curing agent may be present in the composition in an amount of 0.01% to 15% by weight, based on the total weight of the composition, such as 0.02% to 10% by weight, such as 0.03% to 5% by weight.

The theoretical maximum crosslink density (XLD) of the compositions disclosed herein may be calculated according to the formula:

$$XLD = \sum_{i=A}^{N} \frac{X_i}{2EW_i'}$$

where XLD is the crosslink density in moles/g (or moles/kg), $X_i$ is the weight fraction of polymer i, $EW'$ is the adjusted equivalent weight accounting for two functional groups forming a linear polymer and calculated by with the following equation $$\frac{1}{EW_i'} = \frac{1}{EW_i} - \frac{2}{Mw_i}$$

where EW is the functional group equivalent weight in g/mol of the polymer and Mw is the weight average molecular weight of the polymer in g/mol. As used herein, the calculation of theoretical maximum crosslink density only includes reactive epoxide functional resins and reactive thiol functional resins. For non-polymeric species, EW and Mw are calculated based on the known chemical structure. For polymeric species, Mw is determined by GPC (described above) and EW is determined by titration (described above). In instances where rubber particles are dispersed in epoxy resins, the base resin is used to calculate XLD, correcting for the mass of particles as the particles interfere with GPC and EW measurements.

The theoretical maximum crosslink density of the reactive epoxide functional resins and the reactive thiol function resins may be at last 0.9 mol/kg, such as at least 1.2 mol/kg, such as at least 1.3 mol/kg, such as at least 1.5 mol/kg, and may be no more than 4 mol/kg, such as no more than 3 mol/kg, such as no more than 2.5 mol/kg. The theoretical maximum crosslink density of the reactive epoxide functional resins and the reactive thiol function resins may be 0.9 mol/kg to 3 mol/kg, such as 1.2 mol/kg to 2.5 mol/kg, such as 1.3 mol/kg to 4 mol/kg, such as 1.5 mol/kg to 2.5 mol/kg.

A filler material or more than one filler material may optionally be added to the composition. Useful fillers that may be introduced to the composition to provide improved mechanical materials such as fiberglass, fibrous titanium dioxide, whisker type calcium carbonate (aragonite), and carbon fiber (which includes graphite and carbon nanotubes). In addition, fiber glass ground to 5 microns or wider and to 50 microns or longer may also provide additional tensile strength. Additionally, filler material may optionally be graphene and graphenic carbon particles (for example, xGnP graphene nanoplatelets commercially available from XG Sciences, and/or for example, carbon particles having structures comprising one or more layers of one-atom-thick planar sheets of sp2-bonded carbon atoms that are densely packed in a honeycomb crystal lattice. The average number of stacked layers may be less than 100, for example, less than 50. The average number of stacked layers may be 30 or less, such as 20 or less, such as 10 or less, such as 5 or less. The graphenic carbon particles may be substantially flat; however, at least a portion of the planar sheets may be substantially curved, curled, creased, or buckled. The particles typically do not have a spheroidal or equiaxed morphology. Suitable graphenic carbon particles are described in U.S. Publication No. 2012/0129980, at paragraphs [0059]-[0065], the cited portion of which is incorporated herein by reference. Other suitable graphenic carbon particles are described in U.S. Pat. No. 9,562,175, at 6:6 to 9:52, the cited portion of which are incorporated herein by reference.

Organic and/or inorganic fillers, such as those that are substantially spherical, may optionally be added to the composition. Useful organic fillers that may be introduced include cellulose, starch, and acrylic. Useful inorganic fillers that may be introduced include borosilicate, aluminosilicate, calcium inosilicate (Wollastonite), talc, mica, silica and calcium carbonate. The organic and inorganic fillers may be solid, hollow, or layered in composition and may range in size from 10 nm to 1 mm in at least one dimension.

Optionally, additional fillers, thixotropes, colorants, tints and/or other materials also may be added to the composition.

Useful thixotropes that may be used include untreated fumed silica and treated fumed silica, castor wax, clay, organo clay and combinations thereof. In addition, fibers such as synthetic fibers like Aramid® fiber and Kevlar® fiber, acrylic fibers, and/or engineered cellulose fiber may also be utilized.

Useful colorants, dyes, or tints may include red iron pigment, titanium dioxide, calcium carbonate, and phthalocyanine blue and combinations thereof.

Useful fillers that may be used in conjunction with thixotropes may include inorganic fillers such as inorganic clay or silica and combinations thereof.

Exemplary other materials that may be utilized include, for example, calcium oxide and carbon black and combinations thereof.

The filler package (i.e., a mixture of all filler material present in the composition), if present at all, may have a pH of at least 3, such as a pH of at least 3.5, and may have a pH of no more than 13, such as no more than 10.5. pH may be measured using a pH meter such as an Accumet AB 15 Plus pH meter from Fischer Technology or an equivalent instrument, with calibration buffers of pH, 4, 7, and 10, for example. pH may be measured on a 10 weight percent slurry of the filler package in deionized water.

Optionally, the composition may be substantially free, or essentially free, or completely free, of calcium oxide. As used herein, a composition may be "substantially free" of calcium oxide if calcium oxide is not intentionally added or is present in an amount of 0.05% or less by weight based on the total weight of the composition. As used herein, a composition may be "essentially free" of calcium oxide if calcium oxide is present in an amount of 0.03% or less by weight based on the total weight of the composition. As used herein, a composition may be "completely free" of calcium oxide if calcium oxide is not present in the composition, i.e., 0.00% by weight.

Optionally, the composition may be substantially free, or essentially free, or completely free, of any filler material having a pH greater than 10.5. As used herein, a composition may be "substantially free" of a filler having a pH greater than 10.5 (measured on a 10 weight percent slurry of the filler material in deionized water) if such filler is present in an amount of 0.05% or less by weight based on the total weight of the composition. As used herein, a composition may be "essentially free" of a filler having a pH greater than 10.5 if such filler is present in an amount of 0.03% or less by weight based on the total weight of the composition. As used herein, a composition may be "completely free" of a filler having a pH greater than 10.5 if such filler is not present in the composition, i.e., 0.00% by weight.

It has been surprisingly discovered that a composition that is substantially free of a filler having a pH greater than 10.5 is able to cure at a temperature of less than 130° C. It also has been surprisingly discovered that a composition having a filler package having a pH of no more than 10.5 is able to cure at a temperature of less than 130° C.

Such fillers, if present at all, may be present in the composition in an amount of at least 2 percent by weight based on total weight of the composition, such as at least 5 percent by weight, such as at least 10 percent by weight, such as at least 20 percent by weight, and in some instances may be present in an amount of no more than 60 percent by weight based on total weight of the composition, such as no more than 50 percent by weight, such as no more than 25 percent by weight, such as no more than 15 percent by weight. Such fillers may be present in the composition an amount of 2 percent by weight to 25 percent by weight based on total weight of the composition, such as 5 percent by weight to 15 percent by weight, such as 10 percent by weight to 60 percent by weight, such as 20 percent by weight to 50 percent by weight.

Optionally, the composition may be substantially free, or essentially free, or completely free, of platy fillers such as talc, pyrophyllite, chlorite, vermiculite, or combinations thereof. Optionally, the composition may be substantially free, or essentially free, or completely free, of alumina fillers, including plate-like alumina particles, spherical alumina particles, and/or amorphous alumina particles.

The composition may optionally comprise glass microspheres. The glass microspheres may be hollow borosilicate glass. Non-limiting examples of commercially available glass microspheres include 3M Glass bubbles type VS, K series, and S series available from 3M.

Glass microspheres may be present in the composition in an amount of at least 1 percent by weight based on the total weight of the composition, such as at least 2 percent by weight, such as at least 2.5 percent by weight, and may be present in an amount of no more than 30 percent by weight, such as no more than 25 percent by weight, such as no more than 22 percent by weight. Glass microspheres may be present in the composition in an amount of 1 percent to 30 percent by weight based on total weight of the composition, such as 2 percent to 25 percent, such as 2.5 percent to 22 percent.

The composition optionally may comprise at least one plasticizer. As used herein, "plasticizer" refers to a non-polymeric, non-reactive molecule that may be added to the composition to increase flexibility, increase elongation, lower the glass transition temperature, and/or decrease the viscosity.

Examples of plasticizers include phthalate esters such as diisononylphthalate (Jayflex DINP available from Exxon Mobile), diisodecylphthalate (Jayflex DIDP available from Exxon Mobile), and alkyl benzyl phthalate (Santicizer 278 available from Valtris); benzoate-based plasticizers such as dipropylene glycol dibenzoate (K-Flex® available from Emerald Performance Materials); aliphatic esters such as dimethyl adipate, dimethyl sebacate, dibutyl sebacate; and other plasticizers including terephthalate-based dioctyl terephthalate (DEHT available from Eastman Chemical Company); alkylsulfonic acid ester of phenol (Mesamoll available from Borchers); esters of citric acid such as triethyl ester of citric acid (Citroflex 2 from Morflex) and tributyl ester of citric acid (Citroflex 4 from Morflex); and 1,2-cyclohexane dicarboxylic acid diisononyl ester (Hexamoll DINCH available from BASF). Optionally, the composition may be substantially free, or essentially free, or completely free of plasticizer.

The plasticizer, if present at all, may be present in the composition in an amount of at least 1 percent by weight based on the total weight of the composition, such as at least 2 percent by weight, such as at least 3 percent by weight, and may be present in an amount of no more than 15 percent by weight, such as no more than 10 percent by weight, such as no more than 8 percent by weight. The plasticizer may be present in the composition in an amount of 1 percent by weight to 15 percent by weight based on total weight of the composition, such as 2 percent by weight to 10 percent by weight, such as 3 percent by weight to 8 percent by weight.

The composition also may comprise at least one elastomer, such as a reactive or non-reactive elastomeric resin. As used herein, the term "elastomer" refers to a polymeric species added to the composition to increase flexibility and/or increase elongation.

Examples of commercially available non-reactive elastomers include Polyvest® polybutadiene available from Evonik. Examples of reactive elastomers include Hypro® ATBN amine-functional butadiene copolymer available from Emerald Performance Materials, MS Polymer® silyl-terminated polypropylene glycol available from Kaneka, Geniosil® polyether-based silane terminated polymers available from Wacker, and Desmoseal® silane-terminates polyurethane available from Covestro. Optionally, the composition may be substantially free, or essentially free, or completely free, of elastomer.

The elastomer, if present at all, may be present in the composition in an amount of at least 2 percent by weight based on the total weight of the composition, such as at least 5 percent by weight, such as at least 6 percent by weight, and may be present in an amount of no more than 20 percent by weight, such as no more than 15 percent by weight, such as no more than 11 percent by weight. The plasticizer may be present in the composition in an amount of 2 percent by weight to 20 percent by weight based on total weight of the composition, such as 5 percent by weight to 15 percent by weight, such as 6 percent by weight to 11 percent by weight.

The composition also may comprise at least one reactive diluent. As used herein, the term "reactive diluent" refers to a molecule or a compound that has a low vapor pressure such as 2 mm Hg or less at 25° C. and is used to lower the viscosity of a resin but that has at least one functional group capable of reacting with a functional group(s) on molecules or compounds in a composition.

The reactive diluent may be a monomer or a polymer, and may be mono-functional, bi-functional, or multi-functional. Suitable examples of reactive diluent include 1,4-butanediol diglycidyl ether (available as Heloxy modifier BD from Hexion), 1,6-hexanediol diglycidyl ether, mono-functional aliphatic diluents (Epotec RD 108, RD 109, RD 188 available from Aditya Birla), and mono-functional aromatic reactive diluents (Epotec RD 104, RD 105, and RD 136 available from Aditya Birla). Other suitable examples of the reactive diluent include chemically modified functionalized saturated oils, epoxidized castor oil, unsaturated oils such as glycerides of polyunsaturated fatty acids such as nut oils or seed oils, including as examples cashew nut oil, sunflower oil, safflower oil, soybean oil, linseed oil, castor oil, orange oil, rapeseed oil, tall oil, vegetable processing oil, vulcanized vegetable oil, high oleic acid sunflower oil, and combinations thereof.

The reactive diluent may have a boiling point of greater than 100° C., such as greater than 130° C., such as greater than 150° C., for example, and the reactive diluent may have a boiling point of less than 425° C., such as less than 390° C., such as less than 360° C., for example.

The reactive diluent can lower the viscosity of the mixture. According to the present invention, the reactive diluent may have a viscosity of from 1 mPa·s to 4,000 mPa·s at 25° C. according to ASTM D789, such as for example, from 1 mPa·s to 3,000 mPa·s, 1 mPa·s to 2,000 mPa·s, 1 mPa·s to 1,000 mPa·s, 1 mPa·s to 100 mPa·s, or 2 mPa·s to 30 mPa·s.

Optionally, the composition may be substantially free, or essentially free, or completely free, of reactive diluent.

The composition may comprise, or consist essentially of, or consist of, an epoxy-containing compound, a polythiol curing agent, and a second curing agent. The composition may comprise, or consist essentially of, or consist of, an epoxy-containing compound, a polythiol curing agent, elastomeric particles having a core-shell structure and/or a filler package comprising at least one filler, and a second curing agent. As used herein the composition "consists essentially of" an epoxy-containing compound, a polythiol curing agent, and a second curing agent or "consists essentially of" an epoxy-containing compound, a polythiol curing agent, elastomeric particles having a core-shell structure and/or a filler package comprising at least one filler, and a second curing agent when the maximum amount of other components is 5% by weight or less based on total weight of the composition.

The epoxy compound and the polythiol curing agent may be selected so as to provide a composition that cures at low temperatures due to an unexpected and surprising synergistic effect. As used herein, "low temperatures" with respect to the curing of a composition refers to temperatures of 130° C. or below, such as 120° C. or below, such as 110° C. or below, such as 100° C. or below, such as 90° C. or below, such as 80° C. or below, such as 70° C. or below, but greater than ambient, such as greater than 20° C., such as greater than 40° C., such as greater than 50° C.

The present invention may also be a method for preparing a composition comprising, or in some cases consisting of, or in some cases consisting essentially of, an epoxy-containing component, a polythiol curing agent, a second curing agent, and any of the optional further components, if used, described above, the method comprising, or in some cases consisting of, or in some cases consisting essentially of, mixing the epoxy compound, the polythiol curing agent, the second curing agent, and the optional component(s), if used, at a temperature of less than 50° C., such as 0° C. to 50° C., such as 15° C. to 35° C., such as at ambient temperature.

The present invention also is directed to a method for treating a substrate comprising, or consisting essentially of, or consisting of, contacting at least a portion of a surface of the substrate with one of the compositions described hereinabove. The composition may be cured to form a coating, layer or film on the substrate surface by exposing the treated substrate to a temperature of 130° C. or below, such as 90° C. or below.

The present invention is also directed to a method for forming a bond between two substrates comprising, or consisting essentially of, or consisting of, applying the composition described above to a first substrate; contacting a second substrate to the composition such that the composition is located between the first substrate and the second substrate; and curing the composition, such as, for example, by exposing the treated substrate to a temperature of no more than 130° C., such as no more than 120° C., such as no more than 90° C.

The composition described above may be applied alone or as part of a system that can be deposited in a number of different ways onto a number of different substrates. The system may comprise a number of the same or different films, coatings, or layers. A film, coating, or layer is typically formed when a composition that is deposited onto at least a portion of the substrate surface is at least partially cured by methods known to those of ordinary skill in the art (e.g., by exposure to thermal heating).

The composition can be applied to the surface of a substrate in any number of different ways, non-limiting examples of which include brushes, rollers, films, pellets, spray guns and applicator guns.

After application to the substrate(s), the composition may be cured. For example, the composition may be cured by baking and/or curing at elevated temperature, such as at a temperature of 130° C. or below, such as 120° C. or below, such as 110° C. or below, such as 100° C. or below, such as 90° C. or below, such as 80° C. or below, such as 70° C. or below, but greater than ambient, such as greater than 40° C., such as greater than 50° C., and for any desired time period (e.g., from 5 minutes to 1 hour) sufficient to at least partially cure the composition on the substrate(s).

After the composition is applied to a substrate and at least partially cured, the treated substrate may surprisingly demonstrate at least one of the following:

(a) a sound damping loss factor of at least 0.08 at 200 Hz, 10° C., 4 kg/m² measured according to SAE test method J1637 and ASTM E-756 on 240 mm long, 10 mm wide, and 1 mm thick steel panels coated along 215 mm of the length with a coating mass of 4 kg/m²;

(b) a sound damping loss factor of at least 0.08 at 400 Hz, 10° C., 4 kg/m² measured according to SAE test method J1637 and ASTM E-756 on 240 mm long, 10 mm wide, and 1 mm thick steel panels coated along 215 mm of the length with a coating mass of 4 kg/m²;

(c) a sound damping loss factor of at least 0.06 at 400 Hz, 20° C., 4 kg/m² measured according to SAE test method J1637 and ASTM E-756 on 240 mm long, 10 mm wide, and 1 mm thick steel panels coated along 215 mm of the length with a coating mass of 4 kg/m²;

(d) a load at failure greater than 1 MPa measured according to ASTM D-412 with a pull rate of 50 mm/min and a sample configuration as shown in FIG. 1;

(e) an elongation of at least 50% measured according to ASTM D-412 with a pull rate of 50 mm/min and a sample configuration as shown in FIG. 1; or (f) a lap shear of at least 5 MPa measured according to ASTM D1002 on hot dipped galvanized steel with a pull rate of 51 mm/min.

As stated above, the present disclosure is directed to adhesive compositions that are used to bond together two substrate materials for a wide variety of potential applications in which the bond between the substrate materials provides particular mechanical properties related to lap shear strength. The adhesive composition may be applied to either one or both of the substrate materials being bonded such as, by way of non-limiting example, components of an automobile frame or an airplane. The pieces may be aligned and pressure and/or spacers may be added to control bond thickness. The adhesive composition may be applied to cleaned or uncleaned (i.e., including oily or oiled) substrate surfaces. Parts coated with coating compositions may subsequently be baked in an oven to cure the coating composition.

As stated above, the present disclosure is directed to sealant compositions that are used to treat substrates or substrate surfaces. The sealant may provide particular sound damping properties. The sealant composition may be applied to substrate surfaces, including, by way of non-limiting example, a vehicle body or components of an automobile frame or an airplane, and the sealant composition may be allowed to at least partially cure at elevated temperature. The sealant formed by the compositions disclosed herein provides sufficient sound damping, tensile strength and tensile elongation. The sealant composition may be applied to cleaned or uncleaned (i.e., including oily or oiled) substrate surfaces. It may also be applied to a substrate that has been pretreated, coated with an electrodepositable coating, coated with additional layers such as a primer, basecoat, or topcoat. Vehicles or parts coated with coating compositions may subsequently be baked in an oven to cure the coating composition.

As stated above, the present disclosure is directed to coating compositions that are used to treat or coat substrates or substrate surfaces. The coating may provide adhesive properties. The coating composition may be applied to substrate surfaces, including, by way of non-limiting example, a vehicle body or components of an automobile frame or an airplane. The coating composition may be applied to cleaned or uncleaned (i.e., including oily or oiled) substrate surfaces. It may also be applied to a substrate that has been pretreated, coated with an electrodepositable coating, coated with additional layers such as a primer, basecoat, or topcoat. Vehicles or parts coated with coating compositions may subsequently be baked in an oven to cure the coating composition.

It has been surprisingly discovered that the compositions of the present invention are workable for at least 10 days, such as at least 20 days, such as at least 30 days, when stored at ambient conditions. It has been surprisingly discovered that the compositions of the present invention has a viscosity that does not double for at least 10 days after mixing as measured at 1,000 Pa shear stress using an Anton-Paar MCR 301 rheometer at ambient temperature using a 40 mm diameter parallel plate with a 0.5 mm gap in rotation mode.

The substrates that may be coated by the compositions of the present invention are not limited. Suitable substrates include, but are not limited to, materials such as metals or metal alloys, glass, natural materials such as wood, polymeric materials such as hard plastics, or composite materials. For example, suitable substrates include rigid metal substrates such as ferrous metals, aluminum, aluminum alloys, copper, and other metal and alloy substrates. The ferrous metal substrates used may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Aluminum alloys of the 2XXX, 5XXX, 6XXX, or 7XXX series as well as clad aluminum alloys and cast aluminum alloys of the A356 series also may be used as the substrate. Magnesium alloys of the AZ31B, AZ91C, AM60B, or EV31A series also may be used as the substrate. The substrate may also comprise titanium and/or titanium alloys. Other suitable non-ferrous metals include copper and magnesium, as well as alloys of these materials. Suitable metal substrates include those that are used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, and industrial structures and components. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091. The substrate may comprise a composite material such as a plastic or a fiberglass composite. The substrate may be a fiberglass and/or carbon fiber composite. The compositions disclosed herein are particularly suitable for use in various automotive, aerospace, or industrial applications.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

In view of the foregoing the present invention thus relates inter alia, without being limited thereto, to the following aspects:

1. A composition comprising:
   an epoxy-containing compound;
   a polythiol curing agent; and
   a second curing agent;
   wherein the equivalent ratio of epoxide groups to thiol groups is 50:1 to 1:50.
2. The composition of Aspect 1, wherein the equivalent ratio of epoxide groups to thiol groups is 25:1 to 1:28.
3. The composition of Aspect 1 or 2, wherein the epoxy-containing compound has an epoxide equivalent weight of more than 350 g/eq and the polythiol curing agent has a thiol equivalent weight of no more than 600 g/eq.
4. The composition of Aspect 1 or 2, wherein the epoxy-containing compound has an epoxide equivalent weight of no more than 350 g/eq and the polythiol curing agent has a thiol equivalent weight of more than 600 g/eq.
5. The composition of Aspect 1 or 2, wherein the epoxy-containing compound and/or the polythiol curing agent has an equivalent weight of at least 400 g/eq and/or wherein the epoxy-containing compound and/or the polythiol curing agent has an equivalent weight of less than 400 g/eq.
6. The composition of Aspect 5, wherein the epoxy-containing compound has an equivalent weight of at least 400 g/eq and the polythiol curing agent has an equivalent weight of less than 400 g/eq.
7. The composition of Aspect 5, wherein the polythiol curing agent has an equivalent weight of at least 400 g/eq and the epoxy compound has an equivalent weight of less than 400 g/eq.
8. The composition of Aspect 5, wherein the epoxy-containing compound and the polythiol curing agent have an equivalent weight of less than 400 g/eq.
9. The composition of any one of preceding Aspects 1, 2, 4, or 7, wherein the polythiol curing agent has an equivalent weight of at least 1000 g/eq.
10. The composition of any one of the preceding Aspects, further comprising a filler package comprising at least one filler, the filler package having a pH of no more than 10.5 measured on a 10 weight percent slurry of the filler package in deionized water.
11. The composition of any one of the preceding Aspects, wherein the composition has a theoretical maximum resin cross-link density of no more than 4 mol/kg.
12. The composition of any one of the preceding Aspects, wherein the epoxy-containing compound is present in an amount of 4 weight % to 85 weight % based on total weight of the composition.
13. The composition of any one of the preceding Aspects, wherein the polythiol curing agent is present in an amount of 4 weight % to 60 weight % based on total weight of the composition.
14. The composition of any one of the preceding Aspects, further comprising a second polythiol curing agent, such as a polythiol curing agent having at least three functional groups.
15. The composition of any one of the preceding Aspects, wherein the second curing agent is present in an amount of 0.01 weight % to 15 weight % based on total weight of the composition.
16. The composition of any one of the preceding Aspects, wherein the second curing agent comprises a blocked curing agent, an encapsulated curing agent, or combinations thereof.
17. The composition of any one of the preceding Aspects, wherein the second curing agent comprises a urea, an amine-epoxy adduct, or combinations thereof.
18. The composition of any one of the preceding Aspects, wherein the second curing agent comprises a heat-activated latent curing agent such as a secondary and/or a tertiary amine.
19. The composition of any one of the preceding Aspects, further comprising elastomeric particles, a filler material, a plasticizer, a reactive diluent, and/or an elastomer.
20. The composition of Aspect 19, wherein the elastomeric particles have a core-shell structure.
21. The composition of any one of the preceding Aspects, wherein the composition is substantially free of calcium oxide.
22. The composition of any one of the preceding Aspects, wherein the composition is workable at ambient conditions for at least 10 days and/or wherein the composition has a viscosity that does not double for at least 10 days after mixing as measured at 1,000 Pa shear stress using an Anton-Paar MCR 301 rheometer at ambient temperature using a 40 mm diameter parallel plate with a 0.5 mm gap in rotation mode.
23. The composition of any one of the preceding Aspects, wherein the composition is a sealant, an adhesive or a coating composition.
24. A method for treating a substrate comprising: contacting at least a portion of a surface of the substrate with a composition according to any one of preceding Aspects 1 to 23.
25. The method of Aspect 24, further comprising exposing the treated substrate to a temperature of 130° C. or less, for example to a temperature of 90° C. or less.
26. A substrate comprising at least one surface at least partially coated with a layer formed from the composition according to any one of preceding Aspects 1 to 23, for example obtained according to the method according to any one of Aspects 24 or 25.
27. The substrate of Aspect 26, further comprising a film, a second layer, or a coating positioned between the substrate surface and the layer formed from the composition according to any one of preceding Aspects 1 to 23 and/or positioned over the layer formed from the composition according to any one of preceding Aspects 1 to 23.
28. The substrate of any one of Aspects 26 or 27, wherein the substrate has:
   (a) a sound damping loss factor of at least 0.08 at 200 Hz, 10° C., measured according to SAE test method J1637 and ASTM E-756 on 240 mm long, 10 mm wide, and 1 mm thick steel panels coated along 215 mm of the length with a coating mass of 4 kg/m$^2$;
   (b) a sound damping loss factor of at least 0.08 at 400 Hz, 10° C., measured according to SAE test method J1637 and ASTM E-756 on 240 mm long, 10 mm wide, and 1 mm thick steel panels coated along 215 mm of the length with a coating mass of 4 kg/m$^2$;

(c) a sound damping loss factor of at least 0.06 at 400 Hz, 20° C. measured according to SAE test method J1637 and ASTM E-756 on 240 mm long, 10 mm wide, and 1 mm thick steel panels coated along 215 mm of the length with a coating mass of 4 kg/m$^2$;

(d) a load at failure greater than 1 MPa measured according to ASTM D-412 with a pull rate of 50 mm/min and a sample dog bone configuration as shown in FIG. 1;

(e) an elongation of at least 50% measured according to ASTM D-412 with a pull rate of 50 mm/min and a sample dog bone configuration as shown in FIG. 1; or (f) a lap shear of at least 5 MPa measured according to ASTM D1002 on hot dipped galvanized steel with a pull rate of 51 mm/min.

29. The substrate of any one of Aspects 26 to 28 being a part of a vehicle.

30. A vehicle comprising the part of Aspect 29 and/or at least partially coated with the composition according to any one of preceding Aspects 1 to 23.

31. The vehicle of Aspect 30, wherein the vehicle is an automobile or an aircraft.

32. Use of a composition according to any one of preceding Aspects 1 to 23 as a sealant, an adhesive or for coating a vehicle or a part of a vehicle.

Illustrating the invention are the following examples, which, however, are not to be considered as limiting the invention to their details. Unless otherwise indicated, all parts and percentages in the following examples, as well as throughout the specification, are by weight.

EXAMPLES

In the Examples, the following instruments were used to monitor reaction progress: acid value titration (equipment, Metrohm 888 Titrando; reagent, 0.1 N KOH solution in methanol); epoxide equivalent titrate (equipment, Metrohn 888 Titrando; reagent, 0.1 N perchloric acid in glacial acetic acid).

Synthesis of Polycaprolactone Diol Modified Epoxy Resin 948 g of methylhexahydrophthalic anhydride ("MHHPA", commercially available from Dixie Chemical) and 4,054.7 g of Epon 828 (bisphenol A diglycidyl ether epoxy resin commercially available from Hexion Specialty Chemicals) were added to a 12-liter, 4-necked kettle equipped with a motor driven stainless steel stir blade, a water-cooled condenser, a nitrogen blanket, and a heating mantle with a thermometer connected through a temperature feedback control device. The contents of flask were heated to 90° C. and held for 30 minutes. 2,064.0 g of Capa 2077A (polycaprolactone-based diol commercially available from Perstorp Group) was added and the reaction mixture was held at 90° C. for 30 minutes. 395.9 g of Epon 828 and 46.4 g of triphenyl phosphine (available from Sigma Aldrich) were added and the mixture exothermed and was heated to 120° C. after exotherm. The reaction mixture was held at 120° C. until the acid value was less than 2 mg KOH/g by titration using a Metrohm 888 Titrando and 0.1 N KOH solution in Methanol as the titration reagent. The reaction temperature was cooled to 80° C. and the resin was poured out from the flask. The epoxide equivalent of this epoxy adduct was 424 g/epoxide as determined by titration using a Metrohm 888 Titrando and 0.1 N Perchloric acid in glacial acetic acid. The weight average molecular weight was 3,670 g/mol as determined by Gel Permeation Chromatography using a Waters 2695 separation module with a Waters 410 differential refractometer (RI detector) and polystyrene standards. Tetrahydrofuran (THF) was used as the eluent at a flow rate of 1 ml min$^{-1}$, and two PL Gel Mixed C columns were used for separation. The epoxy adduct prepared by this procedure is referred to as CAPA di-/MHHPA/Epon 828 in the following examples.

Synthesis of Polycaprolactone Tetraol Modified Epoxy Resin 1,038.6 g of MHHPA and 4,439.3 g of Epon 828 were added to a 12-liter, 4-necked kettle equipped with a motor driven stainless steel stir blade, a water-cooled condenser, a nitrogen blanket, and a heating mantle with a thermometer connected through a temperature feedback control device. The contents of flask were heated to 90° C. and held for 30 minutes. 1,589.1 g of Capa 4101 (polycaprolactone-based tetraol commercially available from Perstorp Group) was added and the reaction mixture was held at 90° C. for 30 minutes. 433.5 g of Epon 828 and 43.6 g of triphenylphosphine were added and the mixture exothermed and was heated to 120° C. after exotherm. The reaction mixture was held at 120° C. until the acid value was less than 2 mg KOH/g as determined by titration according to the procedure described above. The reaction mixture was cooled to 80° C. and the resin was poured out from flask. The epoxide equivalent of this epoxy adduct was 412 g/epoxide as determined by titration according to the procedure described above. The weight average molecular weight was 18,741 g/mol as determined by the procedure described above. The epoxy adduct prepared by this procedure is referred to as CAPA tetra-/MHHPA/Epon 828 in the following examples.

Synthesis of Polycaprolactone Diol Modified Epoxy Resin

TABLE 1

Preparation of polyTHF650/MHHPA/Epon 828 Epoxy Adduct

| Ingredients | Parts by weight |
|---|---|
| Charge #1 | |
| MHHPA[1] | 84.1 |
| Epon 828[2] | 359.5 |
| Charge #2 | |
| Terathane 650[3] | 162.5 |
| Charge #3 | |
| Epon 828 | 35.1 |
| Triphenylphosphine[4] | 0.2 |

[1]MHHPA is methylhexahydrophthalic anhydride from Dixie Chemical
[2]Epon 828 is Bisphenol A-epichlorohydrin resin from HEXION SPECIALTY CHEMICALS
[3]Terathane 650 polyether polyol is commercially available from BASF
[4]Triphenylphosphine is purchased from Sigma Aldrich Ingredients used to synthesize the polycaprolactone diol modified epoxy resin are provided in Table 1. Charge #1 was added to a 1-liter, 4-necked kettle equipped with a motor driven stainless steel stir blade, a water-cooled condenser, a nitrogen blanket, and a heating mantle with a thermometer connected through a temperature feedback control device. The contents of flask were heated to 90° C. and held for 30 minutes. Charge #2 was added and the reaction mixture was held at 90° C. Charge #3 was added and the mixture was heat to 120° C. after exotherm. Then, the reaction mixture was held at 120° C. until acid value was less than 2 mg KOH/g as determined by titration. The reaction mixture was cooled to 80° C. and the resin was poured out from flask. The epoxide equivalent of this epoxide functional polyether was measure 401 g/eq, and weight average molecular weight determined by GPC was 3511. The epoxy adduct prepared by this procedure is referred to as polyTHF650/MHHPA/Epon 828 in the following examples.

Preparation of 1K Sealant Compositions

Ingredients for 1K sealant compositions are provided in Tables 2, 3, and 5, and comparative example are provided in Table 4. The sealant compositions described below were prepared according to the following procedure with all non-manual mixing performed using a Speedmixer DAC 600FVZ (commercially available from FlackTeck, inc.). The components included under "Resins", "Elastomers", "Plasticizers", and "Accelerators and catalysts" were combined and mixed for 15 seconds at 2,350 revolutions per minutes ("RPM"). The ingredients listed as "Fillers" were then added and mixed for 30 seconds at 2,350 RPM. The mixture was examined with a spatula and given additional mix time, if necessary, to ensure uniformity.

Viscosity was measured 16-24 hours after formulating on an Anton-Paar MCR 301 rheometer at ambient temperature using a 40 mm diameter parallel plate with a 0.5 mm gap in rotational mode. Data were measured every 1 s for 71 s with a linear shear stress from 0-3,500 Pa. Viscosity data are reported at 100 Pa and 1,000 Pa shear stress.

Sealant formulations were drawn down with a 3 mm thick drawdown bar over a woven Teflon baking sheet secured to a steel 4"×12" panel. Sealants in Tables 2, 3, and 5 were baked at 80° C. for 30 minutes in an electric oven. The comparative PVC sealant in Table 4 was baked at 150° C. for 30 minutes in an electric oven. The PVC sealant did not cure when baked at 80° C. for 30 minutes. Samples were allowed to cool and were kept under ambient conditions for at least seven days before die cutting into dog bones. Dog bone were die cut to the dimensions shown in FIG. 1. Dog bone samples were pulled on the Instron model 5567 at a pull rate of 50 mm/min and a clamp distance of 30 mm (clamps gripped 10 mm of the sample). Five dog bones were run for each sealant and the average of the five is reported. Elongation (%) and load at failure (MPa) were determined from the plot of tensile stress versus strain according to ASTM D-412 except as otherwise noted.

Sound damping performance was measured using an Oberst test method. Sealant compositions were applied to uncoated steel bars (240 mm long, 10 mm wide, and 1 mm thick) along 215 mm of the length, leaving a root of bare steel 25 mm at the top of the bar, and across the entire 10 mm width. The sealant compositions were applied at a target weight of either 2.5 kg/m$^2$ or 4 kg/m$^2$, as indicated in the data tables below. The thickness of the sealant compositions varied with their density. Two bars were prepared for each sealant composition described in the tables herein and the average of the two is reported. All bars treated with one of the sealant Compositions 1-9 and 11-20 were baked at 80° C. for 30 minutes in an electric oven. The comparative PVC Composition 10 was baked at 150° C. for 30 minutes in an electric oven. Samples were allowed to cool and were kept under ambient conditions for at least seven days before vibration testing.

Oberst bars were tested according to SAE Test Method J1637 "Laboratory Measurement of the Composite Vibration Damping Properties of Materials on a Supporting Steel Bar" and ASTM Test Method E756 "Standard Test Method for Measuring Vibration-Damping Properties of Materials". The test was conducted in an environmental chamber from Applied Test Systems Chamber Model 3710 with temperature controller model 2010 HC; liquid nitrogen tank and appropriate connections and fittings were used for cooling from ambient temperature. Damping at 200 Hz and 400 Hz was interpolated from resonance frequencies between damping modes 1 and 2 or 2 and 3, respectively, and adjusted for variations from the target mass per area.

TABLE 2

| 1K Sealant Compositions (ingredients reported in parts by weight) | | | | | | |
|---|---|---|---|---|---|---|
| Composition # | 1 | 2 | 3 | 4 | 5 | 6 |
| Thiol resins | | | | | | |
| Thiocure PETMP[5] | 2.7 | 2.7 | — | 2.7 | 2.7 | 2.7 |
| Thiocure TMPMP[6] | 8.4 | 8.4 | — | 8.4 | 8.4 | 8.4 |
| Polythiol QE-340M[7] | — | — | 14.7 | — | — | — |
| Permapol P-3.1e[8] | — | — | 50.5 | — | — | — |
| Elastomers | | | | | | |
| MS polymer SAX 750[9] | 9.7 | — | 9.7 | 9.7 | 9.7 | 9.7 |
| Polyvest 110[10] | — | 9.7 | — | — | — | — |
| Epoxy resins | | | | | | |
| CAPA di-/MHHPA/Epon 828 | 43.3 | 43.3 | — | 43.3 | 43.3 | — |
| polyTHF650/MHHPA/Epon 828 | — | — | — | — | — | 37.1 |
| D.E.N. 431[11] | — | — | 9.2 | — | — | — |
| Epon 828[12] | — | — | 9.2 | — | — | — |
| Plasticizers | | | | | | |
| Jayflex DINP[13] | 6.5 | 6.5 | 6.5 | — | 6.5 | 6.5 |
| Mesamoll[14] | — | — | — | 6.5 | — | — |

TABLE 2-continued

1K Sealant Compositions (ingredients reported in parts by weight)

| Composition # | 1 | 2 | 3 | 4 | 5 | 6 |
|---|---|---|---|---|---|---|
| Accelerators and curing agents | | | | | | |
| Neostann U-220H[15] | 0.2 | — | 0.2 | 0.2 | 0.2 | 0.2 |
| Ajicure PN-50[16] | 0.5 | 0.5 | 0.5 | 0.5 | 0.5 | 0.5 |
| Fillers | | | | | | |
| Ultra Pflex[17] | 36.8 | 36.8 | 36.8 | 36.8 | — | 36.8 |
| Aerosil R 202[18] | — | — | — | — | 5.0 | — |
| Glass bubbles type VS[19] | — | — | — | — | 20.0 | — |
| Epoxide equivalent weight (g/eq, weighted average) | 423 | 423 | 180 | 423 | 423 | 402 |
| Thiol equivalent weight (g/eq, weighted average) | 132 | 132 | 1,320 | 132 | 132 | 132 |
| Theoretical maximum XLD (mol/kg) | 1.87 | 1.87 | | | | |
| Load at failure (MPa) | 2.09 | 1.52 | 1.37 | 2.05 | 1.27 | 2.03 |
| Elongation (%) | 120 | 115 | 50 | 110 | 23 | 63 |
| Loss factor (unitless) at 400 Hz, 10° C., 2.5 kg/m² | 0.062 | 0.073 | 0.007 | 0.057 | 0.141 | 0.047 |
| Loss factor (unitless) at 200 Hz, 10° C., 4 kg/m² | 0.127 | 0.156 | 0.011 | 0.113 | 0.246 | 0.092 |
| Loss factor (unitless) at 400 Hz, 10° C., 4 kg/m² | 0.136 | 0.166 | 0.009 | 0.127 | 0.231 | 0.102 |
| Loss factor (unitless) at 400 Hz, 20° C., 4 kg/m² | 0.078 | 0.104 | 0.009 | 0.065 | 0.310 | 0.072 |
| Viscosity (mPa*s) at 100 Pa shear stress | 1.55E+06 | 8.62E+06 | 6.95E+07 | 1.49E+06 | 6.32E+06 | 1.80E+06 |
| Viscosity (mPa*s) at 1,000 Pa shear stress | 1.92E+05 | 2.80E+05 | 2.45E+08 | 1.80E+05 | 9.09E+06 | 1.17E+05 |

Figure 2:
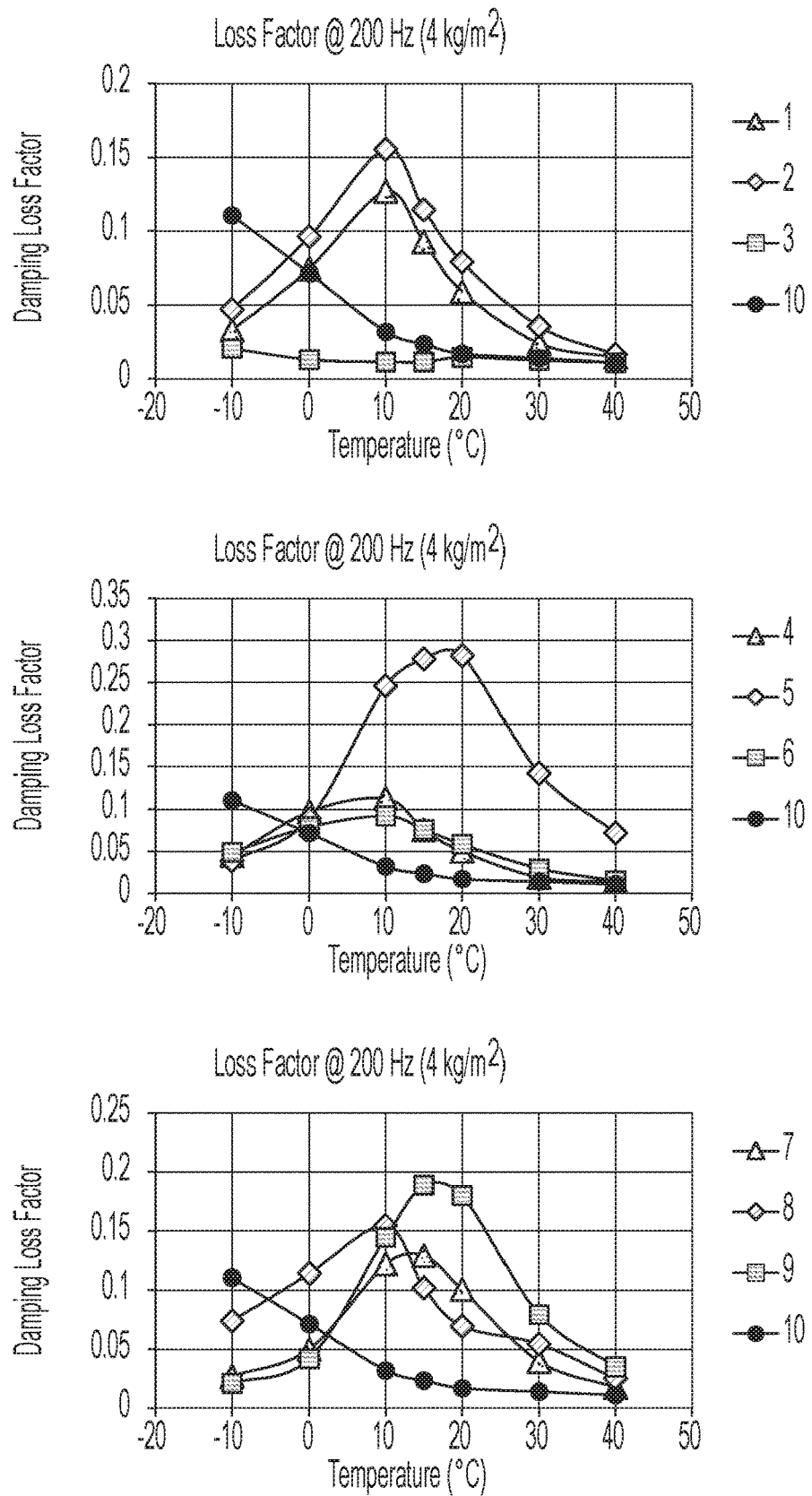
FIG. 2 shows the sound damping performance achieved with Compositions 1 to 10.
Figure 2:
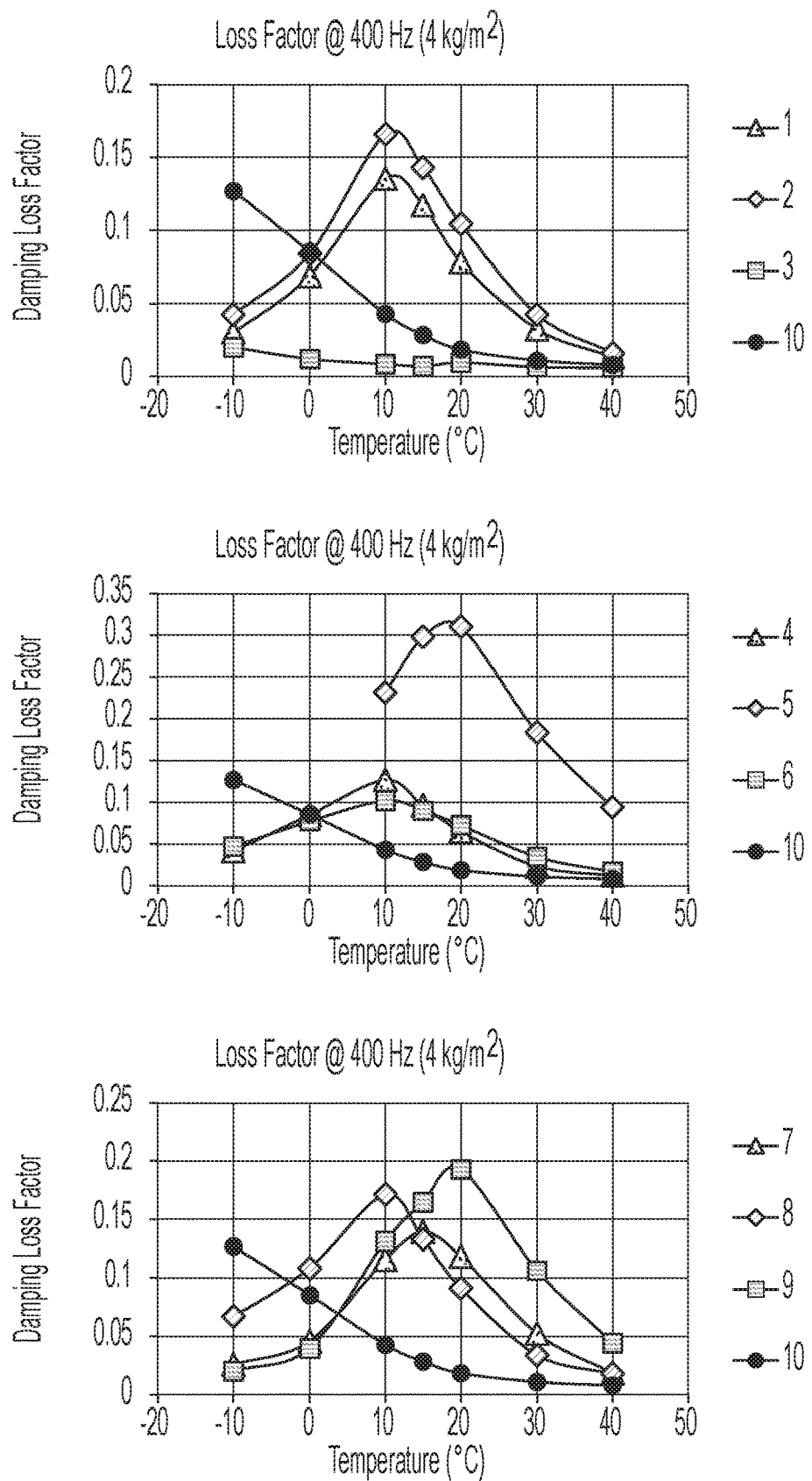
Figure 3:
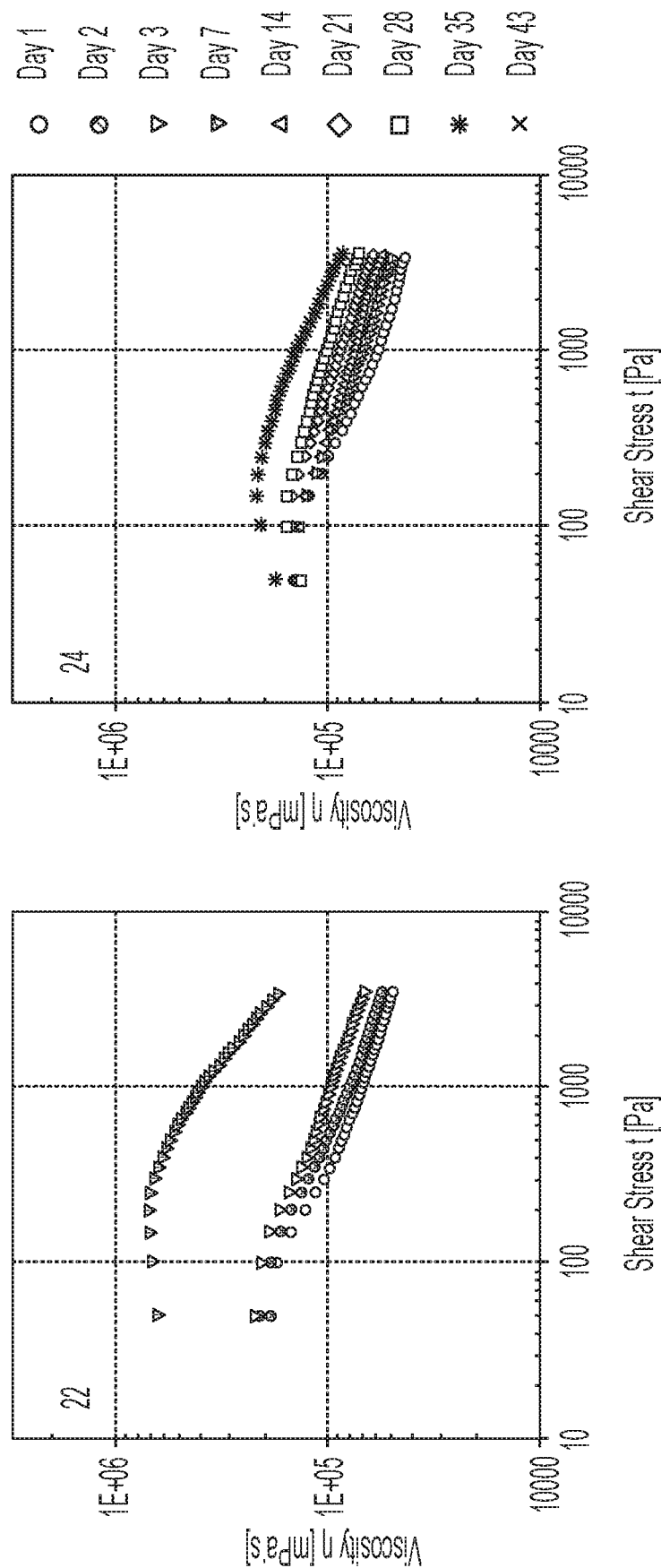
FIG. 3 shows rheology curves showing change in viscosity over time for sealant Compositions 21-27.
Figure 3:
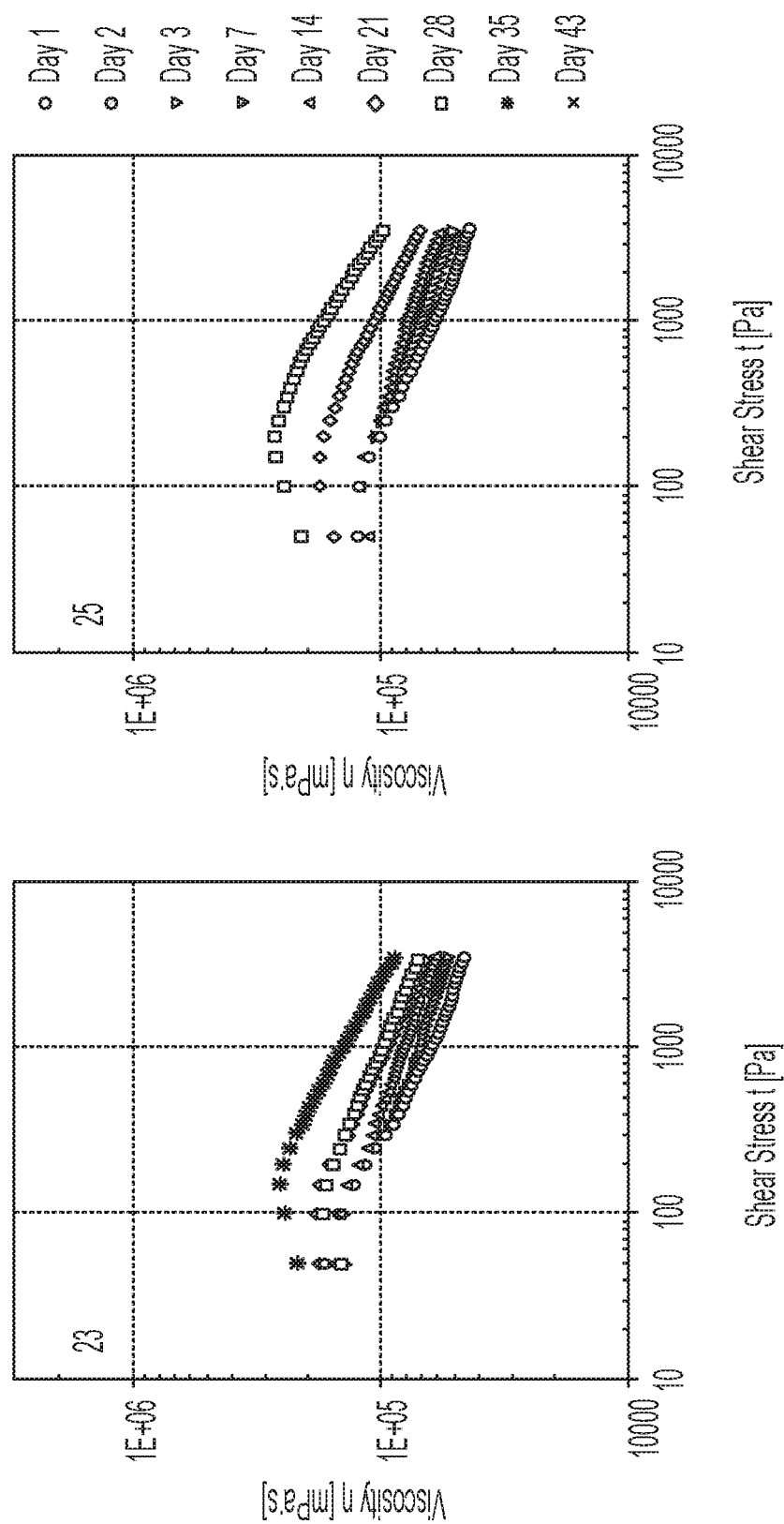
Figure 3:
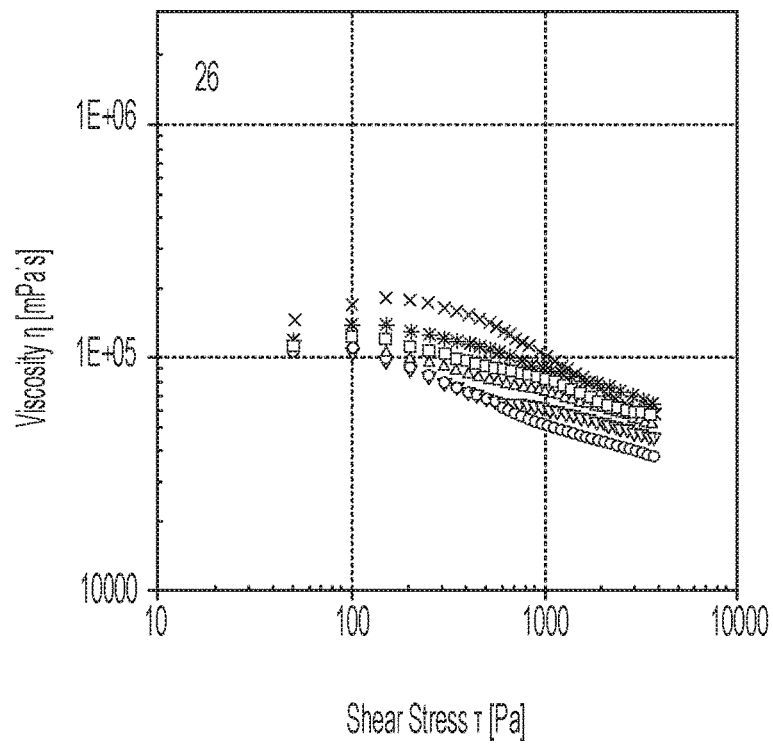
Figure 3:
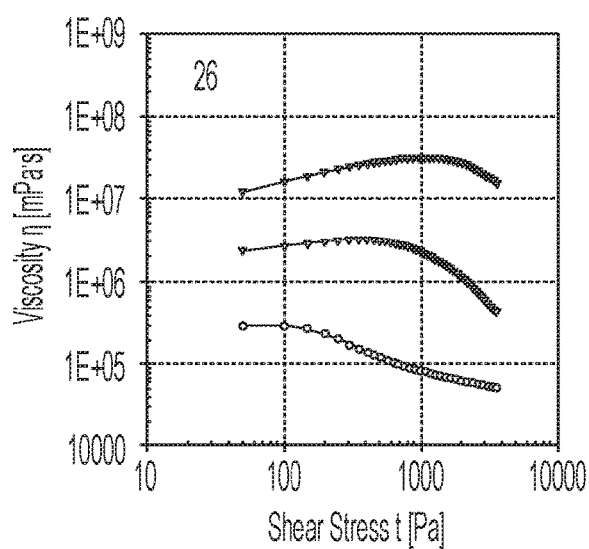
Figure 3:
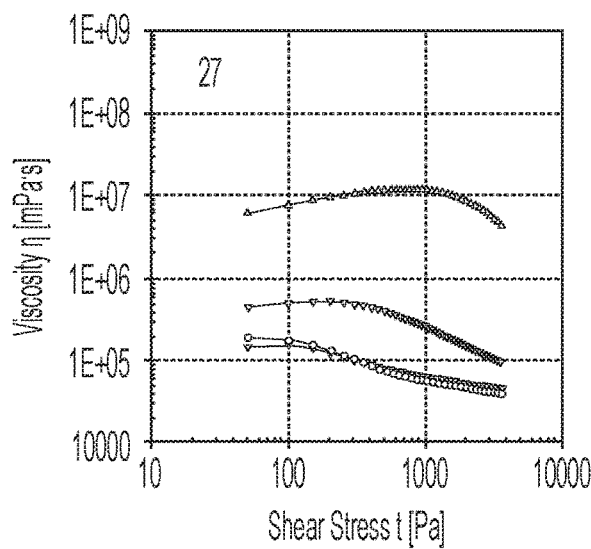
Figure 4:
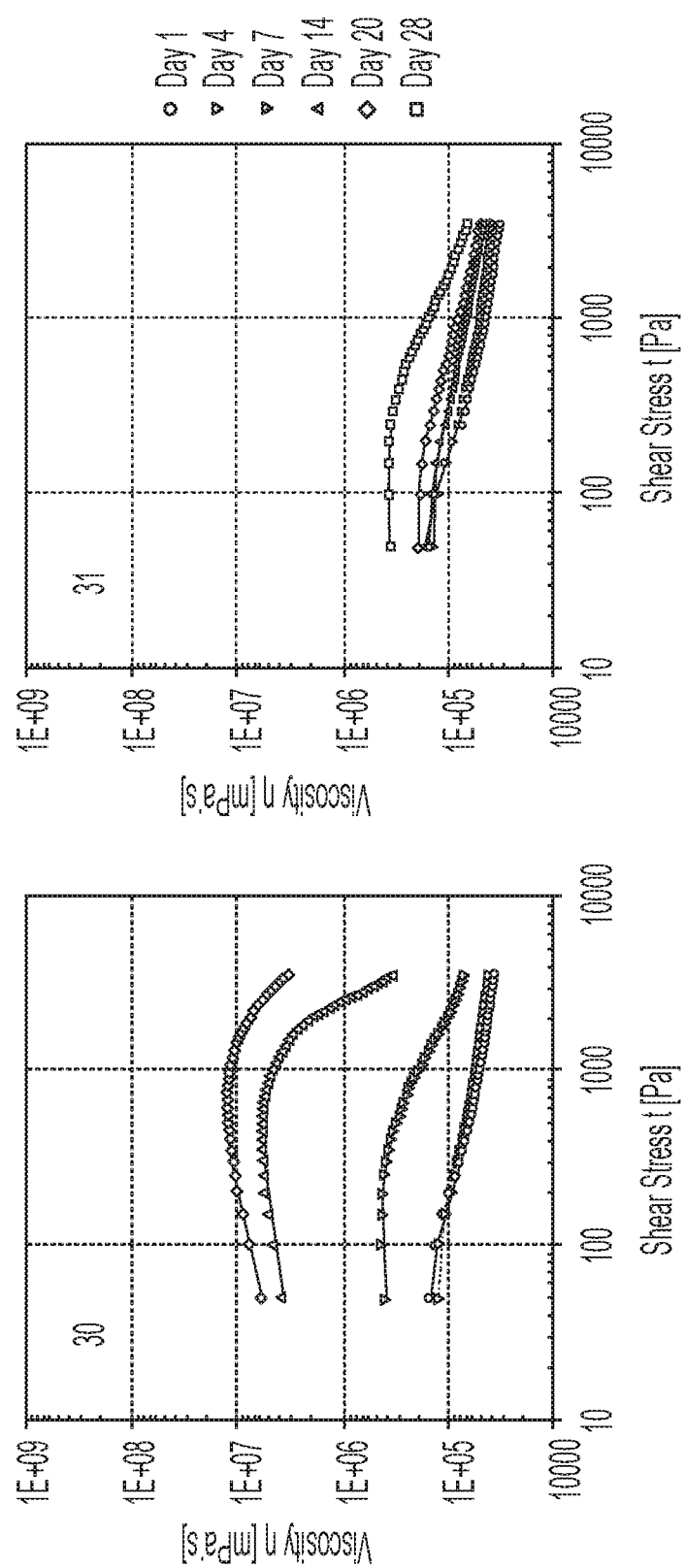
FIG. 4 shows rheology curves showing change in viscosity over time for adhesive Compositions 30 to 35.
Figure 4:
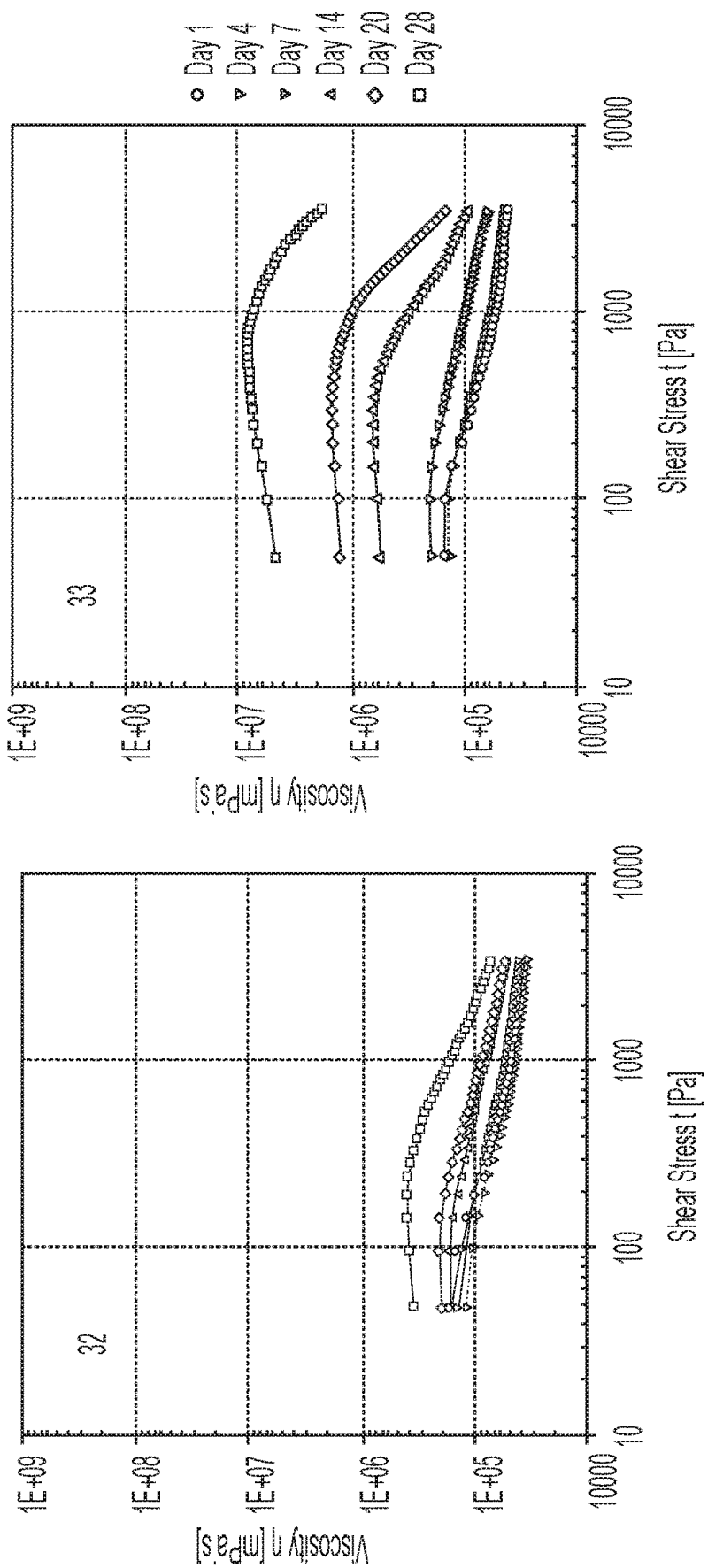
Figure 4:
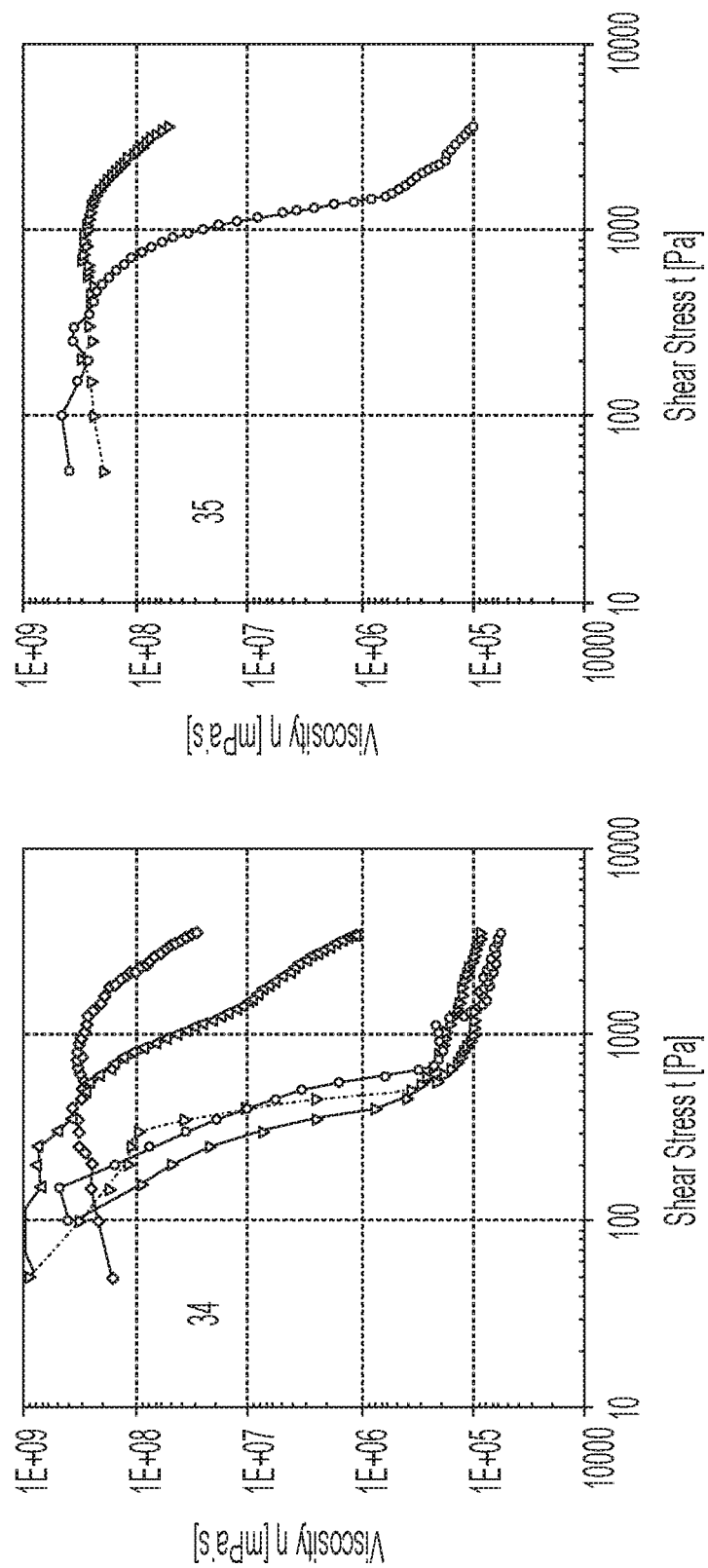
Figure 5:
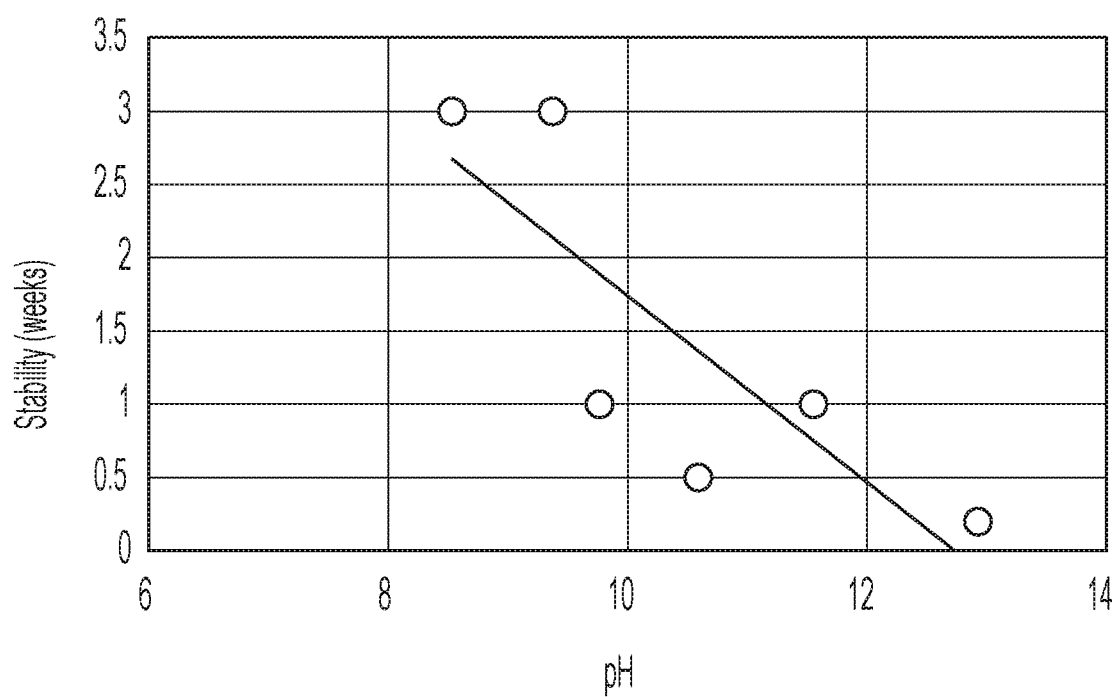
FIG. 5 shows the stability of sealant Compositions 21 and 23 to 25 over time as a function of filler package pH.

[5]Pentaerythritol Tetra(3-mercaptopropionate) available from Bruno Bock Thiochemicals
[6]Trimethylolpropane Tri(3-mercaptopropionate) available from Bruno Bock Thiochemicals
[7]Thiol terminated polyether polymer available from Toray Fine Chemicals
[8]Thiol terminated polythioether polymer from PPG Aerospace
[9]Silyl terminated polyether available from Kaneka Texas Corporation
[10]Polybutadiene available from Evonik Industries
[11]Epoxy novolac available from Dow Chemical Co.
[12]Bisphenol A epichlorohydrin resin available from Huntsman
[13]Diisononyl phthalate available from Exxon Mobile Corporation
[14]Alkylsulfonic acid ester of phenol available from Lanxess Corp.
[15]Dibutyltin diacetylacetonate available from Kaneka Texas Corporation
[16]Amine adduct accelerator for dicyandiamide from Ajinomoto Fine-Techno Co., Inc.
[17]Coated precipitated calcium carbonate available from Specialty Minerals
[18]Hydrophobic fumed silica available from Evonik
[19]Soda lime borosilicate glass bubble available from 3M These data surprisingly demonstrate that the sealant compositions of the present invention cured at 80° C. and also demonstrated load at failure, elongation, sound damping (FIG. 2), and viscosity that were superior to those of comparative Composition #10 (see below). Additionally, these data demonstrate that this performance was achieved with various epoxy-containing compounds, elastomers, plasticizers, fillers, and ratios of epoxide equivalent weight to thiol equivalent weight.

TABLE 3

1K Sealant Compositions (ingredients reported in parts by weight)

| Composition # | 7 | 8 | 9 |
|---|---|---|---|
| Thiol resins | | | |
| Thiocure PETMP | 2.7 | 2.7 | 2.7 |
| Thiocure TMPMP | 8.4 | 8.4 | 8.4 |
| Elastomers | | | |
| MS polymer SAX 750 | 9.7 | — | — |
| Epoxy resins | | | |
| CAPA di-/MHHPA/Epon 828 | 43.3 | 43.3 | 43.3 |
| Plasticizers | | | |
| Jayflex DINP | — | 6.5 | — |
| Curing Agents | | | |
| Neostann U-220H | 0.2 | 0.2 | 0.2 |
| Ajicure PN-50 | 0.5 | 0.5 | 0.5 |
| Fillers | | | |
| Ultra Pflex | 36.8 | 36.8 | 36.8 |
| Load at failure (MPa) | 3.07 | 1.96 | 4.21 |
| Elongation (%) | 89 | 62 | 76 |
| Loss factor (unitless) at 200 Hz, 10° C., 4 kg/m² | 0.122 | 0.154 | 0.145 |
| Loss factor (unitless) at 400 Hz, 10° C., 4 kg/m² | 0.116 | 0.171 | 0.131 |

TABLE 3-continued

1K Sealant Compositions (ingredients reported in parts by weight)

| Composition # | 7 | 8 | 9 |
|---|---|---|---|
| Loss factor (unitless) at 400 Hz, 20° C., 4 kg/m$^2$ | 0.118 | 0.091 | 0.193 |
| Viscosity (mPa*s) at 100 Pa shear stress | 1.12E+07 | 9.53E+06 | 2.46E+07 |
| Viscosity (mPa*s) at 1,000 Pa shear stress | 5.77E+05 | 1.60E+05 | 1.17E+06 |

These data surprisingly demonstrate that the compositions of the present invention cure at 80° C. and have improved sealant properties (load at failure, elongation, and sound damping performance (loss factor)) (FIG. 2) even in when plasticizers and elastomers (which are typically included in sealant compositions) are excluded from the composition.

TABLE 4

PVC Plastisol Sealant Composition (Comparative) (ingredients reported as parts by weight)

| Composition # | 10 |
|---|---|
| PVC resins | |
| Formolon 40[20] | 27.0 |
| Plasticizers | |
| Jayflex DINP | 13.5 |
| Santicizer 278[21] | 4.4 |
| Admex 525[22] | 2.2 |
| Fillers | |
| Ultra Pflex | 21.0 |
| Polycal OS325[23] | 1.5 |
| Additives | |
| Shellsol OMS[24] | 5.0 |
| Nourybond 290[25] | 9.2 |
| Load at failure (MPa) | 2.96 |
| Elongation (%) | 159 |
| Loss factor (unitless) at 200 Hz, 10° C., 4 kg/m$^2$ | 0.032 |
| Loss factor (unitless) at 400 Hz, 10° C., 4 kg/m$^2$ | 0.043 |
| Loss factor (unitless) at 400 Hz, 20° C., 4 kg/m$^2$ | 0.018 |

[20]Polyvinyl chloride-acetate resin available from Formosa plastics
[21]Benzyl phthalate plasticizer available from Valtris Specialty Chemicals
[22]Polymeric plasticizer available from Eastman Chemical Co.
[23]Calcium oxide (quicklime) available from Mississippi Lime Co.
[24]Odorless mineral spirits available from Shell Chemicals Co.
[25]Blocked isocyanate adhesion promoter available from Evonik Industries These data demonstrate that the comparative sealant composition does not demonstrate the sound damping performance reported with compositions of the present invention (FIG. 2) (i.e., Examples #1-#9 described above).

TABLE 5

Curing Agents Used to Cure Sealant Compositions (ingredients reported as parts by weight)

| Composition # | 11 | 12 | 13 | 14 | 15 |
|---|---|---|---|---|---|
| Thiol resins | | | | | |
| Thiocure PETMP | 2.7 | 2.7 | 2.7 | 2.7 | 2.7 |
| Thiocure TMPMP | 8.4 | 8.4 | 8.4 | 8.4 | 8.4 |
| Elastomers | | | | | |
| MS polymer SAX 750 | 9.7 | 9.7 | 9.7 | 9.7 | 9.7 |
| Epoxy resins | | | | | |
| CAPA di-/MHHPA/Epon 828 | 43.3 | 43.3 | 43.3 | 43.3 | 43.3 |
| Plasticizers | | | | | |
| Jayflex DINP | 6.5 | 6.5 | 6.5 | 6.5 | 6.5 |
| Curing Agents | | | | | |
| Neostann U-220H | 0.2 | 0.2 | 0.2 | 0.2 | 0.2 |
| Dyhard MIA5[26] | 0.5 | — | — | — | — |
| Dyhard UR700[27] | — | 0.3 | 1.0 | — | — |
| Dyhard UR400[28] | — | — | — | 0.5 | — |
| Technicure LC-80[29] | — | — | — | — | 0.5 |
| Fillers | | | | | |
| Ultra Pflex | 36.8 | 36.8 | 36.8 | 36.8 | 36.8 |
| Load at failure (MPa) | 2.72 | 1.73 | 2.37 | 1.59 | 1.82 |
| Elongation (%) | 106% | 119% | 115% | 102% | 82% |

[26]Phenol, 4,4'-(1-methylethylidene)bis-, polymer with 2-(chloromethyl)oxirane, reaction products with 2-methyl-1H-imidazole (CAS registry #68002-42-6) available from AlzChem
[27]Substituted urea available from AlzChem
[28]4,4-Methylenediphenylene bis(dimethylurea) available from AlzChem
[29]Amine epoxy adduct available from AC Catalysts The data shown in Table 5 demonstrate that various second curing agents may be used in the sealant compositions of the present invention while maintaining strength, elongation, and low bake requirements.

TABLE 6

Effects of Epoxy and Thiol Equivalent Weights on Strength and Elongation of 1K Sealants (ingredients reported as parts by weight)

| | 16 | 17 | 18 | 19 | 20 |
|---|---|---|---|---|---|
| Thiol resins | | | | | |
| Thiocure PETMP | — | — | 10.5 | 2.7 | — |
| Thiocure TMPMP | — | 10.9 | — | 8.4 | — |
| Permapol P-3.1e | — | 3.6 | 3.5 | — | 137.8 |
| Elastomers | | | | | |
| MS polymer SAX 750 | 9.7 | 9.7 | 9.7 | 9.7 | 9.7 |
| Epoxy resins | | | | | |
| CAPA di-/MHHPA/Epon 828 | 43.3 | 43.3 | 43.3 | — | 43.3 |
| Epon 828 | — | — | — | 19.2 | — |
| Plasticizers | | | | | |
| Jayflex DINP | 6.5 | 6.5 | 6.5 | 6.5 | 6.5 |
| Accelerators and curing agents | | | | | |
| Neostann U-220H | 0.2 | 0.2 | 0.2 | 0.2 | 0.2 |
| Ajicure PN-50 | 0.5 | 0.5 | 0.5 | 0.5 | 0.5 |
| Fillers | | | | | |
| Ultra Pflex | 36.8 | 36.8 | 36.8 | 36.8 | 36.8 |
| epoxide equivalent weight (g/eq, weighted average) | 423 | 423 | 423 | 188 | 423 |
| Thiol equivalent weight (g/eq, weighted average) | 0 | 505 | 503 | 131 | 1630 |
| Maximum theoretical XLD (mol/kg) | 1.63 | 1.73 | 1.96 | 1.41 | 0.76 |
| Load at failure (MPa) | ND | 1.72 | 1.99 | 2.12 | ND |
| Elongation (%) | ND | 133 | 53 | 21 | ND |

*ND = not determined because sample failed to cure

The data in Table 6 demonstrate the effects of epoxy and thiol equivalent weights on the strength and elongation of sealants formed from the 1K sealant compositions of the present invention. Sealant Composition 1 (Table 2) had an epoxide equivalent weight>350 g/eq and a thiol equivalent weight<600 g/eq and Composition 3 (Table 2) had an epoxide equivalent weight less than 350 g/eq and a thiol equivalent weight greater than 600 g/eq. Sealant Composition #16 did not include thiol and demonstrates that a thiol-containing compound was necessary for curing the composition. Sealant Compositions #17 included a 3-functional thiol and Sealant Composition #18 included a 4-functional thiol. Composition #19 was made using an epoxy having an epoxide equivalent weight<400 g/eq and a thiol having a thiol equivalent weight of <400 g/eq and formed a sealant that was stiff and had poor elongation. Composition #20 was made using a thiol containing compound having a thiol equivalent weight>600 g/eq and an epoxy having an epoxy equivalent weight>350 g/eq. Composition #20 did not cure.

Adhesive Compositions

The adhesive compositions described below were prepared according to the following procedure with all non-manual mixing performed using a Speedmixer DAC 600FVZ (commercially available from FlackTeck Inc.). The components included under "Resins" were combined and mixed for two minutes at 2,350 revolutions per minutes ("RPM"). After cooling to ambient temperature, the ingredients listed as "Crosslinker and Catalysts" and "Fillers" were then added and mixed for 25 seconds at 2,350 RPM. The mixture was examined with a spatula and mixed manually. As necessary, the high-speed mixing was repeated to ensure uniformity.

The substrates used were hot dip galvanized (HDG) steel panels ("coupons") according to the test methods described below. Substrates were cleaned using an acetone wipe. A thin coating of oil (Quaker Ferrocote® 61A US) was evenly applied over the coupons in the bonding area. Then, adhesive was applied to the oiled area on one of the coupons of the bond assembly. Uniformity of bond thickness was ensured by addition of 0.25 mm glass spacer beads. Spacer beads were sprinkled evenly over the material, covering no more than 5% of the total bond area. The oiled face of the other test coupon was placed on the bond area and spring-loaded clips were attached one to each side of the bond to hold the assembly together. Excess adhesive that squeezed out was removed with a spatula. Bond assemblies were baked at 120° C. for 30 minutes. Samples were conditioned for at least 16 hours at ambient condition before lap shear testing.

Coupons for lap shear testing were 1.5 mm×25 mm×100 mm HDG from Parker Steel. Five bonded assemblies were prepared for each adhesive and the average of the five is reported. The length of the bonded area was 13 mm and of the non-bonded area was 87 mm. Non-bonded portions were inserted in wedge action grips and pulled apart at a rate of 51 mm/min using an Instron model 5567 in tensile mode. Except as noted, lap shear tests were conducted according to ASTM D1002-10. Shear strength was calculated by Instron's Blue Hill software package.

Ambient stability was measured qualitatively and on an Anton-Paar MCR 301 rheometer. Samples were stored in plastic screw top cups under ambient temperature and humidity.

For qualitative measurements, samples were evaluated between two and five times per week to assess viscosity. Free flowing material was considered unhardened. Slightly to moderately resistant material that could deform and spread under gentle manual force was considered slightly hardened. Material that could not be deformed or spread and which felt rigid was considered fully hardened. The stability in Table 7 is the last recorded day in which the materials were slightly hardened.

For measurements performed using the Anto-Paar MCR 301 rheometer, viscosity was measured at ambient temperature using 40 mm diameter parallel plate with a 0.5 mm gap in rotational mode measuring every 1 s for 71 s with a linear shear stress from 0-3,500 Pa. Samples were considered stable until the viscosity at 1,000 Pa shear stress doubled relative to the initial viscosity (i.e. day 1) at 1,000 Pa shear stress. Samples were once per week except where otherwise noted. Tables 8 and 11 report the viscosity at 1,000 Pa shear stress over time.

The pH of specific fillers and of the filler packages included in the adhesive compositions also was measured and are reported in Table 10. The pH was measured using an Accumet AB 15 Plus pH meter from Fischer Technology. Buffers of pH 4, 7, and 10 available from Fisher Scientific were used for calibration. Except for the HDK H17 fumed silica, the pH was measured on a 10 weight % slurry of the fillers in deionized water. The HDK H17 fumed silica was not compatible with these conditions and for this filler, the pH was measured on a 1 weight % slurry in 50:50 by weight deionized water and methanol.

TABLE 7

Examples of 1K thiol-epoxy adhesive formulation (parts by weight)

| Composition # | 21 | 22 | 23 | 24 | 25 | 26 | 27 | 28 | 29 |
|---|---|---|---|---|---|---|---|---|---|
| Epoxy resins | | | | | | | | | |
| Kane Ace MX-153 [30] | 40 | 40 | 40 | 40 | 40 | 13 | 13 | 13 | 13 |
| CAPA di-/MHHPA/Epon 828 | 16.4 | 16.4 | 16.4 | 16.4 | 16.4 | 5.5 | 5.5 | 5.5 | 8.8 |
| CAPA tetra-/MHHPA/Epon 828 | 10.0 | 10.0 | 10.0 | 10.0 | 10.0 | 3.3 | 3.3 | 3.3 | — |
| Thiol resins | | | | | | | | | |
| Thiocure PETMP [31] | 30.4 | 30.4 | 30.4 | 30.4 | 30.4 | 10.1 | 10.1 | — | — |
| Thiocure TMPMP [32] | — | — | — | — | — | — | — | — | 10.1 |
| Crosslinkers and curing agents | | | | | | | | | |
| Dyhard 100SF [33] | 2.7 | 2.7 | 2.7 | 2.7 | — | — | — | — | — |
| Dyhard UR200 [34] | — | — | 0.3 | — | — | — | — | — | — |

TABLE 7-continued

Examples of 1K thiol-epoxy adhesive formulation (parts by weight)

| Composition # | 21 | 22 | 23 | 24 | 25 | 26 | 27 | 28 | 29 |
|---|---|---|---|---|---|---|---|---|---|
| Dyhard UR700 [35] | — | — | — | 0.6 | 0.3 | — | — | 0.1 | 0.1 |
| Ajicure PN-50 [36] | — | — | — | — | — | 0.9 | 0.9 | — | — |
| Fillers | | | | | | | | | |
| Dakota Pure 3000 [37] | 3.0 | 3.0 | 3.0 | 3.0 | 3.0 | 1.0 | 1.0 | 1.0 | 1.0 |
| NYAD 400 [38] | 3.0 | 3.0 | 3.0 | 3.0 | 3.0 | 1.0 | 1.0 | 1.0 | 1.0 |
| Polycal OS325 [39] | 2.0 | — | — | — | — | 0.7 | — | — | — |
| HDK H17 [40] | 2.0 | 2.0 | 2.0 | 2.0 | 2.0 | 0.7 | 0.7 | 0.7 | 0.7 |
| Maximum theoretical XLD (mol/kg) | 2.16 | 2.16 | 2.16 | 2.16 | 2.16 | 2.17 | 2.17 | 1.24 | 1.63 |
| Lap shear (MPa) | 16.2 | ND* | 14.4 | 14.0 | 14.5 | 10.03 | 9.59 | 0.02 | 6.87 |
| Ambient stability (days) | 9 | 49 | 39 | 35 | 45 | | | | |

[30] 33% Core shell rubber in unmodified, liquid epoxy resin based on Bisphenol-A available from Kaneka;
[31] Pentaerythritol Tetra(3-mercaptopropionate) available from Bruno Bock Thiochemicals;
[32] Trimethylolpropane Tri(3-mercaptopropionate) available from Bruno Bock Thiochemicals;
[33] Cyanoguanidine available from Alz Chem;
[34] 3-(3,4-dichlorophenyl)-1,1-dimethylurea (diuron) available from AlzChem;
[35] High latent accelerator for thermosetting epoxy resin systems available from Alz Chem;
[36] Amine adduct accelerator for dicyandiamide from Ajinomoto Fine-Techno Co., Inc.;
[37] Potassium alumina silicate (mica) available from Pacer Corp;
[38] Calcium metasilicate (wollastonite) available from NYCO division of Imerys;
[39] Calcium oxide (quicklime) available from Mississippi Lime Co.;
[40] Hydrophobic fumed silica available from Wacker
* Not determined as the adhesive did not cure at 120° C. after 30 minutes

TABLE 8

Viscosity stability over time. Data are not shown after viscosity doubled relative to the day 1 time point

| Viscosity (mPa*s) at 1,000 Pa shear stress | Composition # | | | | | | |
|---|---|---|---|---|---|---|---|
| | 21 | 22 | 23 | 24 | 25 | 26 | 27 |
| Day 1 | 6.82E+04 | 6.20E+04 | 5.90E+04 | 5.98E+04 | 5.20E+04 | 8.14E+04 | 5.16E+04 |
| Day 2 | 7.90E+04 | ND | ND | ND | ND | ND | ND |
| Day 3 | 9.63E+04 | ND | ND | ND | ND | ND | ND |
| Day 4 | ND | ND | ND | ND | ND | 2.22E+06 | 5.88E+04 |
| Day 7 | 3.92E+05 | 7.08E+04 | 6.92E+04 | 6.96E+04 | 6.04E+04 | — | 2.31E+05 |
| Day 8 | ND | ND | ND | ND | ND | — | — |
| Day 14 | — | 7.97E+04 | 7.61E+04 | 7.66E+04 | 7.09E+04 | — | — |
| Day 21 | — | 9.26E+04 | 8.78E+04 | 1.06E+05 | 7.44E+04 | — | — |
| Day 28 | — | 9.91E+04 | 1.02E+05 | 1.69E+05 | 8.14E+04 | — | — |
| Day 35 | — | 1.43E+05 | 1.42E+05 | — | 9.22E+04 | — | — |
| Day 43 | — | — | — | — | 1.02E+05 | — | — |

The data in Table 8 demonstrates that the stabilities of Compositions 23-25 are not deleteriously affected by various urea-based latent curing agents. Compositions 26 and 27 show imidazole-based curing agents are not stable. Furthermore, the inclusion of calcium oxide in the adhesive composition destabilizes the composition as shown by Composition 21 compared to 22 and Composition 26 compared to 27. Compositions 28 and 29 demonstrate that the presence of a thiol-containing curing agent is necessary for the composition to achieve a lap shear strength of at least 5 MPa. Composition 29 demonstrates that a theoretical cross-link density of at least 1.6 mol/kg is necessary to achieve a lap shear strength of at least 5 MPa. Specifically, in Composition 29, the theoretical crosslink density was reduced because the thiol-containing curing agent had a thiol functionality of 3 rather than 4 and was reacted with only difunctional epoxy.

TABLE 9

1K Adhesive Compositions (ingredients reported in parts by weight)

| Composition # | 30 | 31 | 32 | 33 | 34 | 35 | 36 |
|---|---|---|---|---|---|---|---|
| Epoxy resins | | | | | | | |
| Kane Ace MX-153 | 13 | 13 | 13 | 13 | 13 | 13 | 13 |
| CAPA di-/MHHPA/Epon 828 | 5.5 | 5.5 | 5.5 | 5.5 | 5.5 | 5.5 | 5.5 |

TABLE 9-continued

1K Adhesive Compositions (ingredients reported in parts by weight)

| Composition # | 30 | 31 | 32 | 33 | 34 | 35 | 36 |
|---|---|---|---|---|---|---|---|
| CAPA tetra-/MHHPA/Epon 828 | 3.3 | 3.3 | 3.3 | 3.3 | 3.3 | 3.3 | 3.3 |
| Thiol resins | | | | | | | |
| Thiocure PETMP | 10.1 | 10.1 | 10.1 | 10.1 | 10.1 | 10.1 | 10.1 |
| Crosslinkers and curing agents | | | | | | | |
| Dyhard UR700 | 0.1 | 0.1 | 0.1 | 0.1 | 0.1 | 0.1 | 0.1 |
| Fillers | | | | | | | |
| Dakota Pure 3000 | — | — | — | — | — | — | — |
| NYAD 400 | — | — | — | — | — | — | — |
| Pyrokisuma 5301 (MgO) | 2.0 | — | — | — | — | — | — |
| Apyral 22 (Al(OH)$_3$) | — | 2.0 | — | — | — | — | — |
| Talkron STYL 10 (talc) | — | — | 2.0 | — | — | — | — |
| Albacar HO (CaCO$_3$) | — | — | — | 2.0 | — | — | — |
| Potassium carbonate (CAS 584-08-7) | — | — | — | — | 2.0 | — | — |
| Sodium phosphate tribasic, dodecahydrate (CAS 10101-89-0) | — | — | — | — | — | 2.0 | — |
| Sodium hydroxide pellets, 97+% ACS reagent | — | — | — | — | — | — | 2.0 |
| HDK H17 | 0.7 | 0.7 | 0.7 | 0.7 | 0.7 | 0.7 | 0.7 |
| Lap shear (MPa) | 11.21 | 9.44 | 10.61 | 11.16 | 11.56 | 5.35 | ND* |

*not determined because sample gelled

TABLE 10

Measured pH of 10 wt % slurry of fillers in deionized water (HDK H17 is 1% in a solution of 1:1 by weight methanol and deionized water)

| Filler | pH |
|---|---|
| Polycal OS325 | 12.85 |
| NYAD 400 | 9.74 |
| Pyrokisuma 5301 | 10.59 |
| Potassium carbonate | 11.55 |
| HDK H17 | 8.75 |
| Example 21 fillers | 12.83 |
| Apyral 22 | 8.53 |
| Talkron STYL 10 | 9.37 |
| Albacar HO | 9.76 |
| Sodium phosphate tribasic | 12.92 |
| Dakota Pure 3000 | 9.32 |
| Example 23-25 fillers | 9.03 |

TABLE 11

Viscosity stability over time. Data are not shown after viscosity doubled relative to the day 1 time point.

| Viscosity (mPa*s) at 1,000 Pa shear stress | Composition # | | | | | | |
|---|---|---|---|---|---|---|---|
| | 30 | 31 | 32 | 33 | 34 | 35 | 36 |
| Day 1 | 4.76E+04 | 4.55E+04 | 4.78E+04 | 5.44E+04 | 2.01E+05 | 2.55E+07 | Not measured |
| Day 4 | 5.25E+04 | 4.41E+04 | 4.56E+04 | 6.23E+04 | 9.64E+04 | 2.58E+08 | — |
| Week 1 | 1.81E+05 | 5.38E+04 | 5.71E+04 | 9.95E+04 | 1.69E+05 | — | — |
| Week 2 | — | 6.51E+04 | 7.31E+04 | 3.09E+05 | 4.29E+07 | — | — |
| Week 3 | — | 7.67E+04 | 8.44E+04 | — | — | — | — |
| Week 4 | — | 1.55E+05 | 1.73E+05 | — | — | — | — |

We claim:

1. A composition comprising:
   an epoxy-containing compound;
   a polythiol curing agent;
   a latent curing agent; and
   a filler package comprising at least one filler, the filler package having a pH of no more than 10.5 measured on a 10 weight percent slurry of the filler package in deionized water;
   wherein the composition remains workable for at least 10 days after mixing.

2. The composition of claim 1, further comprising a second polythiol curing agent.

3. The composition of claim 1, wherein the latent curing agent comprises a blocked curing agent and/or an encapsulated curing agent.

4. A method for treating a substrate comprising:
   contacting at least a portion of a surface of the substrate with a composition according to claim 1.

5. A substrate comprising a surface at least partially coated with a layer formed from the composition of claim 1.

6. The substrate of claim 5, wherein the layer has a lap shear of at least 5 MPa measured according to ASTM D1002 on hot dipped galvanized steel with a pull rate of 51 mm/min.

7. A vehicle comprising the substrate of claim 5.

8. A composition comprising:
an epoxy-containing compound;
a polythiol curing agent; and
a latent curing agent;
wherein the composition has a theoretical maximum resin cross-link density of at least 0.9 mol/kg and no more than 4 mol/kg, calculated according to the formula:

$$XLD = \sum_{i=A}^{N} \frac{X_i}{2EW'_i}$$

wherein XLD is the theoretical crosslink density, $X_i$ is the weight fraction of polymer i, i is the index of summation, EW' is the adjusted equivalent weight calculated according to the equation:

$$\frac{1}{EW'_i} = \frac{1}{EW_i} - \frac{2}{Mw_i},$$

where EW is the functional group equivalent weight, and Mw is the weight average molecular weight.

9. The composition of claim 8, further comprising a second polythiol curing agent.

10. The composition of claim 8, wherein the latent second curing agent comprises a blocked curing agent and/or an encapsulated curing agent.

11. A method for treating a substrate comprising:
contacting at least a portion of a surface of the substrate with a composition according to claim 8.

12. A substrate comprising a surface at least partially coated with a layer formed from the composition of claim 8.

13. The substrate of claim 12, wherein the layer has a lap shear of at least 5 MPa measured according to ASTM D1002 on hot dipped galvanized steel with a pull rate of 51 mm/min.

14. A vehicle comprising the substrate of claim 12.

* * * * *